US010705549B2

(12) United States Patent
Amundson et al.

(10) Patent No.: US 10,705,549 B2
(45) Date of Patent: Jul. 7, 2020

(54) CONTROLLER INTERFACE WITH MENU SCHEDULE OVERRIDE

(75) Inventors: John B. Amundson, Plymouth, MN (US); Heidi J. Finch, Champlin, MN (US); Brent D. Vick, Minnetonka, MN (US)

(73) Assignee: Ademco Inc., Golden Valley, MN (US)

(*) Notice: Subject to any disclaimer, the term of this patent is extended or adjusted under 35 U.S.C. 154(b) by 3973 days.

(21) Appl. No.: 10/726,247

(22) Filed: Dec. 2, 2003

(65) Prior Publication Data

US 2005/0119766 A1 Jun. 2, 2005

(51) Int. Cl.
| G06F 3/01 | (2006.01) |
| G05D 23/19 | (2006.01) |
| F24F 11/62 | (2018.01) |
| F24F 11/30 | (2018.01) |
| G06F 3/00 | (2006.01) |

(52) U.S. Cl.
CPC .......... *G05D 23/1904* (2013.01); *F24F 11/30* (2018.01); *F24F 11/62* (2018.01); *G06F 3/00* (2013.01); *G06F 3/016* (2013.01)

(58) Field of Classification Search
CPC ...... G06F 3/00; G06F 3/0481; G06F 3/04847; G06F 1/163; G06F 3/011; G06F 3/016; G06F 21/00; G06F 9/4445; H04N 5/343; G09G 2340/145; G05D 23/00; F23N 5/20; F24F 7/00; F24F 11/00; F25B 29/00; C12Q 1/68
USPC ........................................................ 715/740
See application file for complete search history.

(56) References Cited

U.S. PATENT DOCUMENTS

| 4,058,253 A | * 11/1977 | Munk ................... F24F 11/0001 165/212 |
| 4,079,366 A | 3/1978 | Wong |
| 4,089,462 A | 5/1978 | Bradford |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,289,272 A | 9/1981 | Murase et al. |
| 4,298,946 A | 11/1981 | Hartsell et al. |

(Continued)

FOREIGN PATENT DOCUMENTS

| DE | 3334117.6 | 4/1985 |
| EP | 0559600 | 9/1993 |

(Continued)

OTHER PUBLICATIONS

Carrier, "Programmable Dual Fuel Thermostat," Installation, Start-Up & Operating Instructions, pp. 1- 12, Oct. 1998.

(Continued)

*Primary Examiner* — Steven P Sax
*Assistant Examiner* — Le Nguyen
(74) *Attorney, Agent, or Firm* — Shumaker & Sieffert, P.A.

(57) ABSTRACT

A method of modifying a programmable schedule for a controller and a controller are disclosed having a user interface. The method includes the steps of providing, simultaneously or sequentially, two or more schedule override choices to a user via the user interface, accepting a selection of one of the two or more schedule override choices from the user via the user interface, and modifying temporarily the schedule based on the user responses provided by the user interface.

31 Claims, 15 Drawing Sheets

(56) References Cited

U.S. PATENT DOCUMENTS

| | | | |
|---|---|---|---|
| 4,308,991 A | 1/1982 | Peinetti et al. | |
| 4,337,822 A | 7/1982 | Hyltin et al. | |
| 4,382,544 A | 5/1983 | Stewart | |
| 4,386,649 A * | 6/1983 | Hines et al. | 165/239 |
| 4,388,692 A * | 6/1983 | Jones et al. | 700/278 |
| 4,431,134 A | 2/1984 | Hendricks et al. | |
| 4,442,972 A | 4/1984 | Sahay et al. | |
| 4,446,913 A * | 5/1984 | Krocker | 165/238 |
| 4,479,604 A | 10/1984 | Didner | |
| 4,506,827 A | 3/1985 | Jamieson et al. | |
| 4,606,401 A | 8/1986 | Levine et al. | |
| 4,621,336 A | 11/1986 | Brown | |
| 4,622,544 A | 11/1986 | Bially et al. | |
| 4,717,333 A | 1/1988 | Carignan | |
| 4,725,001 A | 2/1988 | Carney et al. | |
| 4,777,350 A * | 10/1988 | Crocket et al. | 219/497 |
| 4,837,731 A | 7/1989 | Levine et al. | |
| 4,881,686 A | 11/1989 | Mehta | |
| 4,918,439 A | 4/1990 | Wozniak et al. | |
| 4,948,040 A | 8/1990 | Kobayashi et al. | |
| 4,992,779 A | 2/1991 | Sugino et al. | |
| 4,997,029 A | 3/1991 | Otsuka et al. | |
| 5,012,973 A | 5/1991 | Dick et al. | |
| 5,038,851 A | 8/1991 | Mehta | |
| 5,042,997 A * | 8/1991 | Rhodes | 96/18 |
| 5,053,752 A | 10/1991 | Epstein et al. | |
| 5,065,813 A | 11/1991 | Berkeley et al. | |
| 5,086,385 A * | 2/1992 | Launey et al. | 700/83 |
| 5,088,645 A | 2/1992 | Bell | |
| 5,140,310 A | 8/1992 | DeLuca et al. | |
| 5,161,606 A | 11/1992 | Berkeley et al. | |
| 5,170,935 A | 12/1992 | Federspiel et al. | |
| 5,181,653 A * | 1/1993 | Foster et al. | 236/49.3 |
| 5,230,482 A | 7/1993 | Ratz et al. | |
| 5,238,184 A | 8/1993 | Adams | |
| 5,251,813 A | 10/1993 | Kniepkamp | |
| 5,257,736 A * | 11/1993 | Roy | 236/49.3 |
| 5,259,445 A * | 11/1993 | Pratt et al. | 165/241 |
| 5,259,553 A * | 11/1993 | Shyu | 236/49.3 |
| 5,279,458 A * | 1/1994 | DeWolf et al. | 236/47 |
| 5,289,362 A * | 2/1994 | Liebl et al. | 700/22 |
| 5,293,755 A | 3/1994 | Thomas | |
| 5,329,991 A | 7/1994 | Mehta et al. | |
| 5,344,068 A * | 9/1994 | Haessig | F24F 11/00 236/47 |
| 5,348,078 A * | 9/1994 | Dushane et al. | 165/209 |
| 5,386,577 A | 1/1995 | Zenda | |
| 5,395,042 A * | 3/1995 | Riley et al. | 236/46 R |
| 5,482,209 A | 1/1996 | Cochran et al. | |
| 5,526,422 A | 6/1996 | Keen | |
| 5,537,106 A | 7/1996 | Mitcuhashi | |
| 5,566,879 A | 10/1996 | Longtin | |
| 5,570,837 A | 11/1996 | Brown et al. | |
| 5,673,850 A * | 10/1997 | Uptegraph | 236/46 R |
| 5,720,658 A * | 2/1998 | Belusa | 454/238 |
| 5,735,134 A * | 4/1998 | Liu | F25B 49/02 62/183 |
| 5,761,083 A * | 6/1998 | Brown et al. | 700/296 |
| 5,782,296 A * | 7/1998 | Mehta | 165/268 |
| 5,818,428 A | 10/1998 | Eisenbrandt et al. | |
| 5,873,519 A | 2/1999 | Beilfuss | |
| 5,886,697 A | 3/1999 | Naughton et al. | |
| 5,901,183 A | 5/1999 | D'Souza | |
| 5,902,183 A | 5/1999 | D'Souza | |
| 5,924,486 A * | 7/1999 | Ehlers | F24F 11/006 165/238 |
| 5,937,942 A | 8/1999 | Bias et al. | |
| 5,947,372 A | 9/1999 | Tiernan | |
| 6,020,881 A | 2/2000 | Naughton et al. | |
| 6,032,867 A | 3/2000 | Dushane et al. | |
| 6,059,195 A | 5/2000 | Adams et al. | |
| 6,073,110 A * | 6/2000 | Rhodes et al. | 705/8 |
| 6,081,197 A | 6/2000 | Garrick et al. | |
| 6,108,614 A * | 8/2000 | Lincoln | F24F 11/006 340/3.1 |
| 6,121,875 A | 9/2000 | Hamm et al. | |
| 6,140,987 A | 10/2000 | Stein et al. | |
| 6,192,282 B1 | 2/2001 | Smith et al. | |
| 6,196,467 B1 | 3/2001 | Dushane et al. | |
| 6,196,468 B1 * | 3/2001 | Young | 236/46 R |
| 6,208,331 B1 | 3/2001 | Singh et al. | |
| 6,236,326 B1 | 5/2001 | Murphy | |
| 6,275,166 B1 * | 8/2001 | del Castillo | H04L 12/2803 340/10.1 |
| 6,285,912 B1 | 9/2001 | Ellison et al. | |
| 6,290,140 B1 | 9/2001 | Pesko et al. | |
| 6,310,554 B1 * | 10/2001 | Carrell | 340/601 |
| 6,315,211 B1 | 11/2001 | Sartain et al. | |
| 6,318,639 B1 | 11/2001 | Toth | |
| 6,330,806 B1 | 12/2001 | Beaverson et al. | |
| 6,351,693 B1 | 2/2002 | Monie et al. | |
| 6,344,861 B1 | 3/2002 | Naughton et al. | |
| 6,398,118 B1 | 6/2002 | Rosen et al. | |
| 6,478,084 B1 * | 11/2002 | Kumar | F24F 11/0012 165/238 |
| 6,478,233 B1 | 11/2002 | Shah | |
| 6,502,758 B2 * | 1/2003 | Cottrell | 236/46 R |
| 6,518,957 B1 | 2/2003 | Lehtinen et al. | |
| 6,578,770 B1 | 6/2003 | Rosen | |
| 6,580,950 B1 | 6/2003 | Johnson et al. | |
| 6,581,846 B1 | 6/2003 | Rosen | |
| 6,595,430 B1 * | 7/2003 | Shah | 236/46 R |
| 6,619,555 B2 | 9/2003 | Rosen | |
| 6,621,507 B1 | 9/2003 | Shah | |
| 6,622,926 B1 * | 9/2003 | Sartain | F24F 11/006 236/46 R |
| 6,685,098 B2 * | 2/2004 | Okano et al. | 236/47 |
| 6,731,992 B1 * | 5/2004 | Ziegler, Jr. | 700/65 |
| 6,786,421 B2 | 9/2004 | Rosen | |
| 6,814,299 B1 * | 11/2004 | Carey | 236/46 R |
| 6,824,069 B2 * | 11/2004 | Rosen | 236/94 |
| 6,886,754 B2 * | 5/2005 | Smith et al. | 236/10 |
| 6,983,889 B2 * | 1/2006 | Alles | 236/49.1 |
| 7,000,849 B2 * | 2/2006 | Ashworth et al. | 236/94 |
| 7,130,719 B2 * | 10/2006 | Ehlers et al. | 700/276 |
| 7,146,253 B2 * | 12/2006 | Hoog et al. | 700/276 |
| 7,150,408 B2 * | 12/2006 | DeLuca | 236/94 |
| 2001/0029585 A1 | 10/2001 | Simon et al. | |
| 2001/0042684 A1 | 11/2001 | Essalik et al. | |
| 2001/0052459 A1 | 12/2001 | Essalik et al. | |
| 2002/0005435 A1 | 1/2002 | Cottrell | |
| 2002/0092779 A1 | 7/2002 | Essalik et al. | |
| 2003/0034897 A1 | 2/2003 | Shamoon et al. | |
| 2003/0034898 A1 | 2/2003 | Shamoon et al. | |
| 2003/0121652 A1 | 7/2003 | Carey et al. | |
| 2003/0123224 A1 | 7/2003 | LaCroix et al. | |
| 2003/0126298 A1 * | 7/2003 | Redford | H04L 12/2856 709/250 |
| 2003/0142121 A1 | 7/2003 | Rosen | |
| 2003/0150926 A1 | 8/2003 | Rosen | |
| 2003/0150927 A1 | 8/2003 | Rosen | |
| 2003/0216837 A1 * | 11/2003 | Reich | G05B 13/021 700/276 |
| 2003/0233201 A1 * | 12/2003 | Horst et al. | 702/62 |
| 2004/0074978 A1 | 4/2004 | Rosen | |
| 2004/0193324 A1 * | 9/2004 | Hoog | G05B 19/042 700/276 |
| 2004/0245352 A1 | 12/2004 | Smith | |
| 2004/0254654 A1 * | 12/2004 | Donnelly | H02J 3/14 700/22 |
| 2004/0262410 A1 | 12/2004 | Hull | |

FOREIGN PATENT DOCUMENTS

| | | |
|---|---|---|
| EP | 0636961 A1 | 2/1995 |
| EP | 0636981 | 2/1995 |
| EP | 0678204 | 3/2000 |
| EP | 0985994 | 3/2000 |
| EP | 1074009 | 7/2001 |
| WO | WO 97/11448 | 3/1997 |
| WO | WO 97/39392 | 10/1997 |

(56) References Cited

FOREIGN PATENT DOCUMENTS

| WO | WO 01/52515 | 7/2001 |
|---|---|---|
| WO | WO 01/79952 | 10/2001 |
| WO | WO 01/93779 | 12/2001 |

OTHER PUBLICATIONS

Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control, Installation, Start-Up, and Operating Instructions," pp. 1-12, Aug. 1999.
CorAccess, "Companion 6," User Guide, pp. 1-20, Jun. 17, 2002.
http://www.thermostatsales.com, Robertshaw, "9610 Digital Programmable Thermostat" 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.therrnostatsales.com, Robertshaw, "9720 Deluxe Programmable Thermostat," 3 pages, printed Jun. 17, 2004.
Hunter, "44200/44250," Owner's Manual, 32 pages, printed prior to filing date.
Hunter, "44300/44350," Owner's Manual, 35 pages, printed prior to filing date.
Hunter, "Auto Saver 550", Owner's Manual Model 44550, 44 pages, printed prior to filing date.
Invensys™, "9700i 9701i 9715i 9720i Deluxe Programmable Thermostats," User's Manual, pp. 1-28, printed prior to filing date.
Lux, "511 Series Smart Temp Electronic Thermostat," Owner's Manual, 3 pages, printed prior to filing date.
Lux, "600 Series Smart Temp Electronic Thermostat," Owner's Manual, 3 pages, printed prior to filing date.
Lux, "602 Series Multi-Stage Programmable Thermostat," Owner's Manual, 2 pages, printed prior to filing date.
Lux, "605/2110 Series Programmable Heat Pump Thermostat," Owner's Manual, 3 pages, printed prior to filing date.
Lux, "700/9000 Series Smart Temp Electronic Thermostat," Owner's Manual, 3 pages, printed prior to filing date.
Lux, "PSPH521 Series Programmable Heat Pump Thermostat," Owner's Manual, 3 pages, printed prior to filing date.
Lux, "TX1500 Series Smart Temp Electronic Theimostat," Owner's Manual, 6 pages, printed prior to filing date.
Lux, "TX500 Series Smart Temp Electronic Thermostat," Owner's Manual, 3 pages, printed prior to filing date.
Lux, "ELVI Programmable Line Voltage Thermostat," Owner's Manual, 3 pages, printed prior to filing date.
Metasys, "HVAC Pro for Windows User's Manual," 308 pages, 1998.
http://www.ritetemp.info/rtMenu_13.html, Rite Temp 8082, 8 pages, printed Jun. 20, 2003.
Totaline, "1 for All programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual F. 1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1000RF, 21 pages, 2000.
Warmly Yours, "Model TH111GFCI-P (120 VAC)," Manual, pp. 1-4, printed prior to filing date.
White-Rodgers, "Installation Instructions for Heating & Air Conditioning IF72 5/2 Day Programmable Heat Pump Thermostat," 8 pages, printed prior to filing date.
White-Rodgers, "Installation Instructions for Heating & Air Conditioning IF78 5/2 Day Programmable Thermostat," 7 pages, printed prior to filing date.
White-Rodgers, "Comfort-Set 90 Series Thermostat," Manual, pp. 1-24, printed prior to filing date.
White-Rodgers, "Comfort-Set III Thermostat," Manual, pp. 1-44, printed prior to filing date.
White-Rodgers, 1F80-240 "(for Heating Only systems) Programmable Electronic Digital Thermostat," Installation and Operation Instructions, 8 pages, printed prior to filing date.
White-Rodgers, 1F80-241 "Programmable Electronic Digital Thermostat," Installation and Operation Instructions, 6 pages, printed prior to filing date.
White-Rodgers, 1F80-261 "Programmable Electronic Digital Thermostat," Installation and Operation Instructions, 8 pages, printed prior to filing date.
White-Rodgers, 1F81-261 "Programmable Electronic Digital Multi-Stage Thermostat," Installation and Operation Instructions, 8 pages, printed prior to filing date.
White-Rodgers, 1F82-261 "Programmable Electronic Digital Heat Pump Thermostat," Installation and Operation Instructions, 8 pages, printed prior to filing date.
www.icmcontrols.com, Simplecomfort, SC3000 Single Stage Heat/Single Stage Cool or Single Stage Heat Pump/Manual Changeover, 1 page, printed prior to filing date.
www.icmcontrols.com, Simplecomfort, SC3001 Single Stage Heat/Single Stage Cool or Single Stage Heat Pump/Manual Changeover, 1 page, printed prior to filing date.
www.icmcontrols.com, Simplecomfort, SC3006 Single Stage Heat/Single Stage Cool or Single-Stage Heat Pump/Manual Changeover, 1 page, printed prior to filing date.
www.icmcontrols.com, Simplecomfort, SC3201 2 Stage Heat Pump Manual Changeover, 1 page, printed prior to filing date.
www.icmcontrols.com, Simplecomfort, SC3801 2 Stage Heat/2 Stage Cool 2 Stage Heat Pump/Audio Changeover, 1 page, printed prior to filing date.
Blister Pack Insert from a Ritetemp 8082 Touch Screen Thermostat Product, 2 pages, 2002.
Operation Manual for Ritetemp Touch Screen Thermostat 8082, 8 pages, 2002.
Trouble Shooting Guide for Ritetemp Thermostat 8082, 1 page, 2002.
Quick Start Guide for Ritetemp Thermostat 8082, 1 page, 2002.
Install Guide for Ritetemp Thermostat 8082, 6 pages, 2002.
Remote Control Power Requirement for Ritetemp Thermostat 8082, 1 page, 2002.
Mounting Template for Ritetemp Thermostat 8082, 1 page, 2002.
Aprilaire Electronic Thermostats Models 8344, 8346, 8348, 8363, 8365, 8366 Operating Instructions, 8 pages, prior to filing date of present application.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
Braeburn Model 3000 Owner's Manual, pp. 1-13, 2001.
Braeburn Model 5000 Owners Manual, pp. 1-17, 2001.
BRK First Alert, User's Manual, Smoke and Fire Alarms, pp. 1-7, Nov. 2002.
BRK Electronics Maximum Protection Plus Ultimate Convenience Smoke Alarm, 24 pages, prior to filing date of present application.
Carrier Microelectronic Programmable Termostat Owner's Manual, pp. 1-24, May 1994.
Carrier TSTATCCRF01 Programmable Digital Thermostat, pp. 1-21, prior to filing date of present application.
Danfoss RT51/51RF & RT52/52RF User Instructions, 2 pages, Jun. 2004.
Firex Smoke Alarm, Ionization Models AD, ADC Photoelectric Model Pad, 4 pages, prior to filing date of present application.

(56) References Cited

OTHER PUBLICATIONS

Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions. pp. 1-12, 2002.
Honeywell TH8000 Series Programmable Thermostats, Owner's Guide, pp. 1-44, 2004.
Honeywell, MagicStat® CT3200 Programmable Thermostat, Installation and Programming Instructions, pp. 1-24, 2001.
Invensys Deluxe Programmable Thermostats 9700, 9701, 9715, 9720, User's Manual, 21 pages, prior to filing date of present application.
Lux TX9000 Installation, 3 pages, prior to filing date of present application.
Ritetemp Operation 8029, 3 pages, Jun. 19, 2002.
Ritetemp Operation 8050, 5 pages, Jun. 26, 2002.
Ritetemp Operation 8085, pp. 1-6, prior to filing date of present application.
Sealed Unit Parts Co., Inc., Supco & CTC Thermostats . . . loaded with features, designed for value!, 6 pages, prior to filing date of present application.
Totaline Model P474-1035 Owner's Manual Programmable 5-2 Day Digital Thermostat, pp. 1-21, prior to filing date of present application.
Totaline Star CPE230RF, Commercial Programmable Thermostat Wireless Transmitter, Owner's Manual, pp. 1-6, Oct. 1998.
Totaline Star P/N P474-0130 Non-Programmable Digital Thermostat Owner's Manual, pp. 1-22, prior to filing date of present application.
White-Rodgers 1F80-224 Programmable Electronic Digital Thermostat, Installation and Operation Instructions, 8 pages, prior to filing date of present application.
White-Rodgers Installation Instructions for Heating & Air Conditioning IF78 Non-Programmable Thermostat, 6 pages, prior to filing date of present application.
White-Rodgers, Comfort-Set 90 Series Premium, 4 pages, prior to filing date of present application.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Business Wire, "MicroTouch Specialty Products Group to Capitalize on Growing Market for Low-Cost Digital Matrix Touchscreens," p. 1174 (2 pages), Jan. 6, 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
DeKoven et al., "Designing Collaboration in Consumer Products," 2 pages, 2001.
Freudenthal et al., "Communicating extensive smart home functionality to users of all ages: the design of a mixed-initiative multimodal thermostat-interface," pp. 34-39, Mar. 12-13, 2001.
Honeywell News Release, "Honeywell's New Sysnet Facilities Integration System for Boiler Plant and Combustion Safety Processes," 4 pages, Dec. 15, 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Product Review—Philips Pronto Remote Control," http://hometheaterhifi.com/volume_6_2/philipsprontoremotecontrol.html, 5 pages, dated May 1999, printed Aug. 20, 2004.
"CorAccess Systems/In Home," http://web.archive.org/web20011212084427/www.coraccess.com/home.html, 1 page, copyright 2001, printed Aug. 19, 2004.
"A Full Range of Alternative User Interfaces for Building Occupants and Operators," http://www.automatedbuildings.com/news/jan00/articles/andover/andover.htm, 5 pages, dated Jan. 2000, printed Sep. 20, 2004.
http://www.cc.gatech.edu/computing/classes/cs6751_94_fall/groupc/climate-2/node1.html, "Contents," 53 pages, printed Sep. 20, 2004.
"HAI Company Background," http://www.homeauto.com/AboutHAI/abouthai_main.htm, 2 pages, printed Aug. 19, 2004.
Cardio, by Secant; http://www.hometoys.com/htinews/apr98/reviews/cardio.htm, "HTINews Review," Feb. 1998, 5 pages, printed Sep. 14, 2004.
Cardio Manual, available at http://www.secant.ca/En/Documentation/Cardio2é-Manual.pdf, Cardio Home Automation Inc., 55 pages, printed Sep. 28, 2004.
Domotique Secant Home Automation—Web Page, available at http://www.secant.ca/En/Company/Default.asp, 1 page, printed Sep. 28, 2004.
"Vantage Expands Controls for Audio/Video, HVAC and Security," http://www.hometoys.com/htinews/aug99/releases/vantage03.htm, 2 pages, dated Aug. 3, 1999, printed Aug. 20, 2014.
Visor Handheld User Guide, Copyright 1999-2000.
"Home Toys Review—TouchLinc", http://www.hometoys.com/htinews/aug99/reviews/touchlinc/touchlinc.htm, 3 pages, dated Aug. 1999, printed Aug. 20, 2004.
"RC X10 Automation Forum: Control your Heating and Cooling System with Promo(1/1)," http://www.remotecentral.com/cgi-bin/mboard/rc-x10/thread.cgi?12, 2 pages, dated Apr. 23, 1999, printed Aug. 20, 2004.
Blake et al., "Seng 310 Final Project" Report, dated Apr. 6, 2001.
Blake et al., "Seng 310 Final Project Demo Program" Illustration, 3 pages, Apr. 6, 2001.
"Spotlight on integrated systems," Custom Builder, V8, N2, p. 66(6), Mar.-Apr. 1993.
AutomatedBuildings.com Article—"Thin Client" Solutions, "Pressure, Air Flow, Temperature Humidity & Valves," Dwyer Instruments, Inc., 5 pages, printed Sep. 20, 2004.
Prolifix Inc., "Web Enabled IP Thermostats," 2 pages, prior to filing date of present application.
ADT Security Systems, "iCenter Advanced User Interface 8142ADT User Guide," pp. 1-136, 2001.
DeKoven et al., "Measuring Task Models in Designing Intelligent Products," pp. 188-189, 2002.
http://www.hometoys.com/htinews/apr99/releases/hal01.htm, HTI News Release, pp. 1-3, printed Oct. 28, 2004.
U.S. Appl. No. 10/440,474, filed May 15, 2003, entitled "Reverse Images in a Dot Matrix LCD for an Environmental Control Device."

(56) References Cited

OTHER PUBLICATIONS

U.S. Appl. No. 10/654,230, filed Sep. 3, 2003, entitled "Programmable Thermostat Incorporating a Liquid Crystal Display and Having a Feature for Mounting Horizontally, Vertically and any Intermediate Orientation."

U.S. Appl. No. 10/654,235, filed Sep. 3, 2003, entitled "Programmable Thermostat Incorporating a Liquid Crystal Display Selectively Presenting Adaptable System Menus Including Changeable Interactive Virtual Buttons."

International Preliminary Report on Patentability from International Application No. PCT/US2004/037868, dated Jun. 7, 2006, 8 pp.

Written Opinion of International Application No. PCT/US2004/037868, dated Sep. 6, 2005, 7 pp.

Search Report and Publication of International Application No. PCT/US2004/037868, Search Report completed Mar. 15, 2005, 6 pp.

\* cited by examiner

CONTROLLER INTERFACE WITH MENU SCHEDULE OVERRIDE

FIELD OF THE INVENTION

The present invention relates generally to the field of programmable controllers for homes and/or buildings and their related grounds. More specifically, the present invention relates to simplified interfaces for such controllers having menu schedule override capabilities.

BACKGROUND OF THE INVENTION

Controllers are used on a wide variety of devices and systems for controlling various functions in homes and/or buildings and their related grounds. Some controllers have schedule programming that modifies device parameters such as set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

HVAC controllers, for example, are often employed to monitor and, if necessary, control various environmental conditions within a home, office, or other enclosed space. Such devices are useful, for example, in regulating any number of environmental conditions within a particular space including, for example, temperature, humidity, venting, air quality, etc. The controller may include a microprocessor that interacts with other components in the HVAC system. For example, in many modern thermostats for use in the home, a controller unit equipped with temperature and humidity sensors may be provided to interact with a heater, blower, flue vent, air compressor, humidifier and/or other components, to control the temperature and humidity levels at various locations within the home or office. A sensor located within the controller unit and/or one or more remote sensors may be employed to sense when the temperature and/or humidity (or other environmental conditions) reaches a certain threshold level, causing the controller unit to send a signal to activate or deactivate one or more component in the system.

The controller may be equipped with an interface that allows the user to monitor and adjust the environmental conditions at one or more locations within the building. With more modern designs, the interface typically includes a liquid crystal display (LCD) panel inset within a housing that contains a microprocessor as well as other components of the controller. In some designs, the interface may permit the user to program the controller to activate on a certain schedule determined by the user. For example, the interface may include a menu routine that permits the user to change the temperature at one or more times during a particular day. Once the settings for that day have been programmed, the user can often repeat the process to change the settings for the remaining days.

Many modern controller have the capability to temporarily override the normal programmed schedule. This may be useful when, for example, a user changes their schedule which deviates from the normal programmed schedule in the controller. For many controllers, a number of steps are often required to establish a one time temporary program override. In some cases, the interface is simply too cumbersome or complex to be conveniently used to program a temporary override. This often results in disabling the normal programmed schedule in favor of manually adjusting the controller. However, when this occurs, the energy saving benefits of the programmable controller are not realized. Accordingly, there is an ongoing need in the art to decrease the time and complexity associated with temporarily modifying a schedule in a programmable controller.

SUMMARY OF THE INVENTION

Generally, the present invention pertains to simplified interfaces for controllers having schedule override capabilities. In one illustrative embodiment, a method of modifying a schedule for a controller having a user interface is provided. The illustrative method includes the step of: providing, simultaneously or sequentially, two or more schedule override choices to a user via the user interface; accepting one or more user responses to the two or more schedule override choices from the user via the user interface and modifying temporarily the schedule based on the user responses provided by the user interface.

In another illustrative embodiment, the method includes the steps of: providing one or more schedule override menu choices to a user via the user interface; accepting one or more user responses to the one or more schedule override choices from the user via the user interface at a first time and temporarily modifying the schedule based on the user responses provided by the user interface at a second time, when the second time is later than the first time, in some cases, by a chosen time interval.

In yet another illustrative embodiment, the method includes the steps of: providing one or more schedule comfort override menu choices to a user via the user interface; accepting a start time, end time and comfort temperature response to the one or more schedule comfort override choices from the user via the user interface at a first time and modifying one or more of the schedule parameters based on the user responses provided by the user interface at a second time. The second time is later than the first time, in some cases, by a chosen time interval.

In another illustrative embodiment, the method includes the steps of: providing one or more schedule energy saving override menu choices to a user via the user interface; accepting a start time, end time and energy saving temperature response to the one or more schedule comfort override choices from the user via the user interface at a first time and modifying one or more of the schedule parameters based on the user responses provided by the user interface at a second time. The second time is later than the first time, in some cases, by a chosen time interval. Controllers adapted to provide the above methods are also contemplated.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
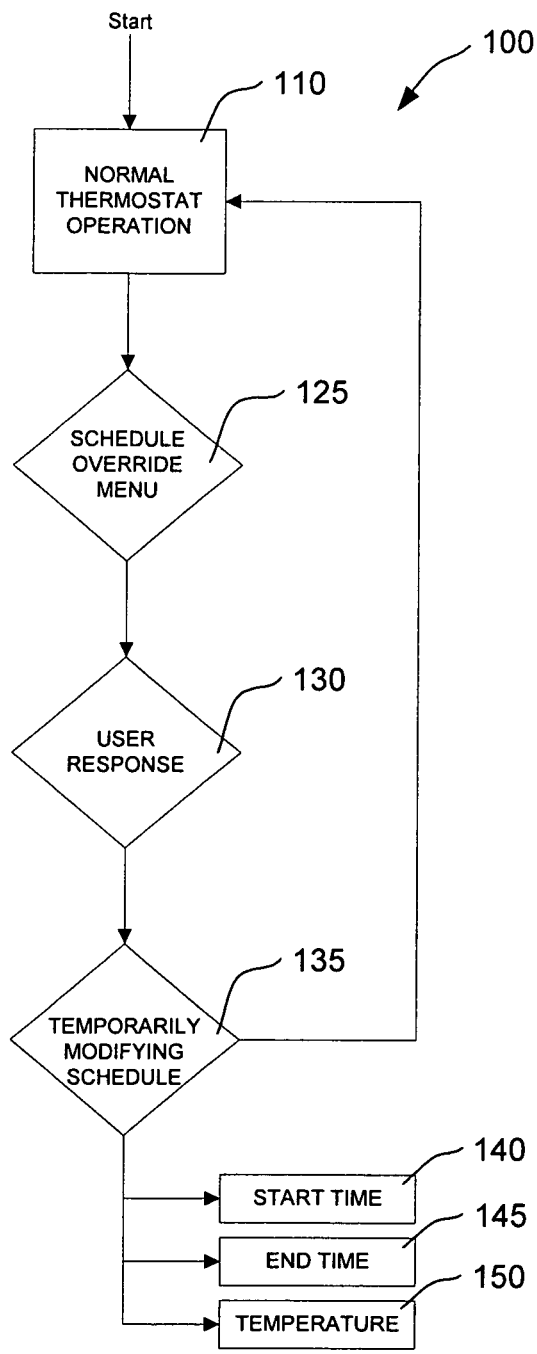
FIG. 1 is a flow diagram of an illustrative HVAC schedule override program.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Generally, the present invention pertains to simplified interfaces for controllers having schedule override programming capabilities. These controllers can be used in a variety of systems such as, for example, HVAC systems, sprinkler systems, security systems, lighting systems, or any other suitable controllers. The Figures depict HVAC controllers. While the present invention is not so limited, an appreciation of various aspects of the invention will be gained through a discussion of the examples provided below.

FIG. 1 is a flow diagram of an illustrative HVAC schedule override program 100. The flow diagram starts at a normal thermostat operation block 110, although this is not required in all embodiments. For the illustrative embodiment, when operating in normal thermostat operation block 110, a programmed thermostat schedule may be followed to regulate environmental conditions of the area where, for example, a temperature sensor is located. The programmed schedule can activate the controller to send one or more control signals to HVAC equipment on a certain schedule, many times determined by the user. The interface may include a menu routine that permits the user to program the schedule which may then change the temperature and/or other parameter at one or more times during a particular day, such as a temperature setting for a "wake" time interval, followed by a "leave" time interval, followed by a "return" time interval and/or followed by a "sleep" time interval. In some embodiments, the user can program a start time and a heat and/or cool temperature set point for each desired time interval.

Schedule override menu block 125 provides one or more schedule override menu choices to a user via the user interface. The user interface can accept one or more responses at block 130 to the one or more schedule override menu choices from the user via the user interface to temporarily modify a preexisting schedule at block 135. One or more schedule parameters 140, 145, 150 may be temporarily modified based on the user responses provided by the user interface. Once the temporary schedule override time interval ends, the controller can return to the normal operation block 110.

Schedule override menu block 125 can provide one, two, three, four, five, six, seven, eight, nine, or ten or more menu choices from which a user can chose. In some embodiments, these menu choices can also solicit information from the user regarding the parameters of the desired schedule override condition such as, for example, the starting time of the override schedule, the ending time and/or duration of the override schedule and/or the desired temperature of the override schedule. The schedule override menu choices block 125 can include choices that are natural language questions, some of which may be phrases with one, two, three, four, five, six, or seven or more words. In some cases, schedule override menu choices block 125 can provide choices such as, for example, "Come Home Late," "Come Home Early," "Get Up Early," "Stay Home," On Vacation," "Stay Up Late," and/or any other suitable menu choice, as desired. The menu choices can be provided to the user as soft buttons (e.g. variable function, software configured) and/or hard buttons on the controller and/or user interface, and/or a touch screen interface may be provided, as desired. The override choices can be provided to the user in either a simultaneous or sequential manner.

Once the user chooses an override choice from the schedule override menu, the program can cause an appropriate temporary schedule override. For instance, using the predefined schedule structure described above (wake, leave, return, sleep), if the user chooses "Get Up Early" the program can request a start time from the user, and either apply the "wake" temperature setting or request a temperature setting from the user. Accordingly, the program can either apply an end time that corresponds to the next sequential time a temperature changes (i.e., "leave" time) according to the normal operating schedule, as described above, or request an end time and/or duration from the user. Once the next sequential temperature change occurs according to the normal operating schedule, or according to an end time or duration entered by the user, the controller may return to the normal operating schedule. Using such an approach, a user can quickly and easily modify the normal thermostat operating schedule to accommodate one or more temporary interruptions or overrides in the normal thermostat operating schedule.

Figure 2:
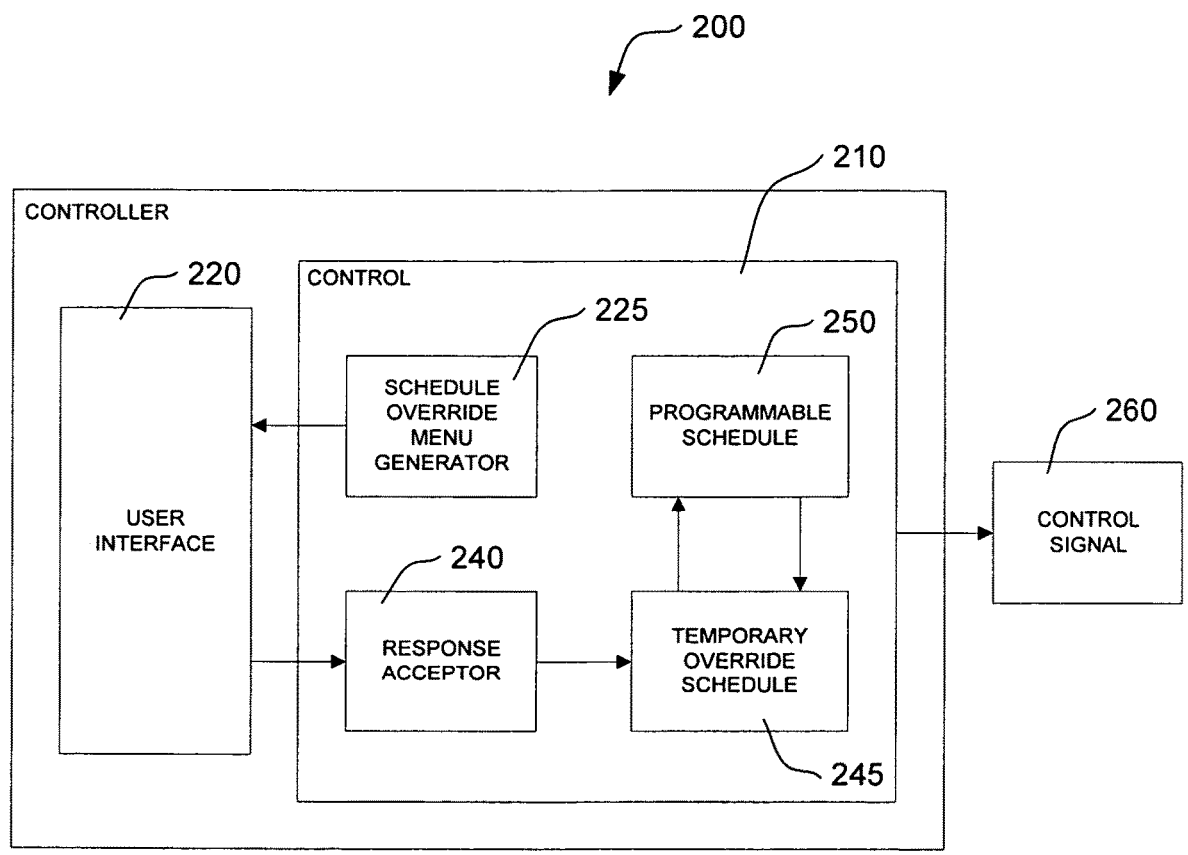
FIG. 2 is a block diagram of the illustrative HVAC schedule override program shown in FIG. 1.

FIG. 2 is a block diagram of the illustrative HVAC controller that is adapted to include the schedule override method shown in FIG. 1. Controller 200 can include a control module 210, that in some embodiments, can be a microprocessor or the like. The control module 210 communicates with a user interface 220, and includes a schedule override menu generator 225, a response acceptor 240, a temporary override schedule 245 and a programmable schedule 250. The control module 210 can generate a control signal 260 to a device (not shown), such as an HVAC system or device as desired.

The schedule override menu generator 225 can provide temporary schedule override choices, as described above, to the user interface 220. The interface 220 can be any form of user interface such as, for example, a physical interface including an LCD screen with selection buttons, a touchscreen, an aural interface including a speaker and microphone or both, or any other suitable user interface. A user can activate the schedule override menu generator 225 by a suitable selection mechanism, such as by pressing a schedule button on a touchscreen of the user interface 220. In response to the schedule override choices, the user can enter a user response into the user interface 220. The response acceptor 240 accepts the user response and provides an indication of the response to the temporary override schedule 245 which communicates with the programmable schedule 250. In the illustrative embodiment, the programmable schedule 250 has a number of time and temperature set points previously defined. The temporary override schedule overrides the programmable schedule 250 for an appropriate time period, such as one identified by the user response, or until the schedule 250 signals a temperature change based on the normal operating schedule. A control signal 260 is generated by the control module 210 based on the temporary override schedule 245.

Figure 3:
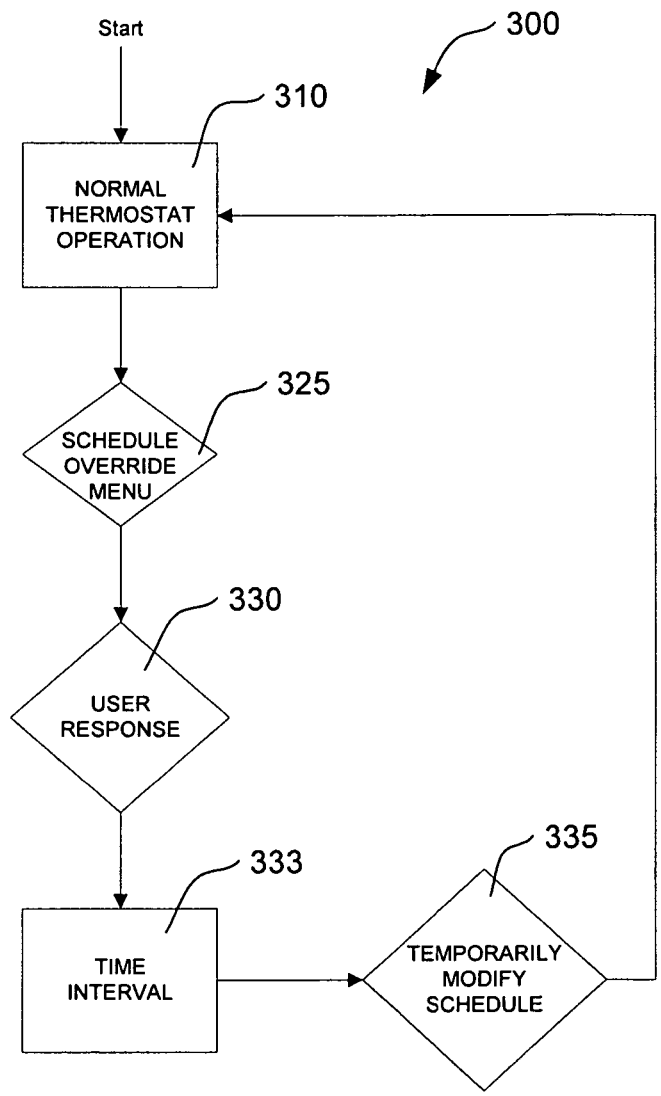
FIG. 3 is a flow diagram of another illustrative HVAC schedule override program.

FIG. 3 is a flow diagram of another illustrative HVAC schedule override program 300. The flow diagram starts at a normal thermostat operation block 310, although this is not required in all embodiments.

In the illustrative embodiment, when operating in the normal thermostat operation block 310, a programmed thermostat schedule may be followed to regulate environmental conditions of the area where, for example, a temperature sensor is located. The programmed schedule can activate the controller to send one or more control signals to HVAC equipment on a certain schedule, many times determined by the user. The interface may include a menu routine that permits the user to program the schedule, which may then change the temperature and/or other parameter at one or more times during a particular day, such as a temperature setting for a "wake" time interval, a "leave" time interval, a "return" time interval and/or a "sleep" time interval. In the illustrative embodiment, the user can program a start time and a heat and/or cool temperature for each desired time interval.

Schedule override menu block 325 provides one or more schedule override menu choices to a user via the user interface. The user interface can accept one or more responses at block 330 to the one or more schedule override menu choices from the user at a first time via the user interface to temporarily modify a preexisting schedule at block 335 at a second time that is later than the first time, as indicated by time interval block 333. At the second later time, the schedule is modified based on the user responses provided by the user interface at the earlier first time. In the illustrative embodiment, once the temporary schedule override expires, the controller returns to the normal operation block 310.

Schedule override menu block 325 can provide one, two, three, four, five, six, seven, eight, nine, or ten or more menu choices from which a user can chose. In some embodiments, these menu choices can also solicit information from the user regarding the parameters of the desired schedule override condition such as, for example, the starting time of the override schedule, the ending time or duration of the override schedule, and/or the desired temperature of the override schedule. The schedule override menu choices block 325 can include choices that are natural language questions, some of which may be phrases which can include one, two, three, four, five, six, seven or more words. In some cases, schedule override menu choices block 325 can provide menu choices such as, for example, "Come Home Late," "Come Home Early," "Get Up Early," "Stay Home," "On Vacation," "Stay Up Late," and/or any other suitable menu choice, depending on the application.

The chosen time interval 333 can be, for example, at least 10 minutes, at least 30 minutes, at least 1 hour, at least 4 hours, at least 24 hours, or any other time interval, as desired.

The time interval can be determined by the schedule override program based on the schedule override menu choice selected by the user. For instance, using the predefined schedule structure described above (wake, leave, return, sleep), the user may choose and the controller may accept a schedule override menu choice of "Stay Up Late" at 7:00 a.m. The program can request an end time or duration from the user, and either apply the normal operating schedule "return" temperature setting or request a temperature setting from the user to be applied until the end time provided by the user. If the user entered an end time of 11:00 p.m. versus a normal operating "return" end time of, for example, 9:00 p.m., then at 11:00 p.m. the controller may apply the normal operating "sleep" temperature set point and resume normal thermostat operation. In this example, the user provided the override input at 7:00 a.m., and the modified the normal operating schedule is temporarily overridden 14 hours later when the normal operating schedule is scheduled to change to the "sleep" temperature control signal at 9:00 p.m. Instead the controller continued to send a "return" temperature signal until 11:00 p.m. The controller may then return to normal thermostat operation in accordance to the normal operating schedule at 11:00 p.m.

Thus, a user can quickly and easily modify the normal thermostat operating schedule to accommodate interruption in the normal thermostat operating schedule without disabling the normal thermostat schedule or completely reprogramming the controller before the thermostat interruption. Thus, the user can schedule a one or more interruptions in the normal thermostat operating schedule that will modify the normal thermostat operating schedule at a future time and then return the operating schedule to its normal operating schedule.

Figure 4:
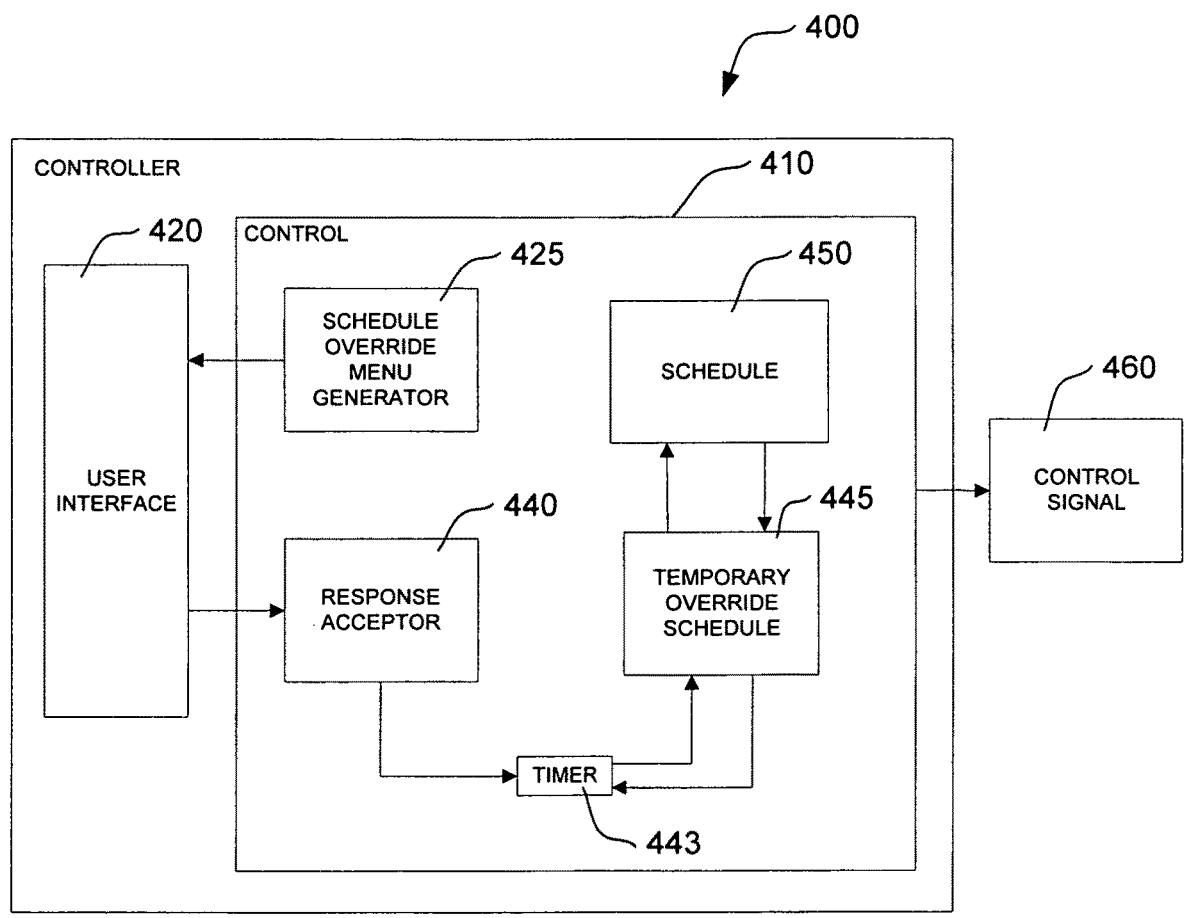
FIG. 4 is a block diagram of the illustrative HVAC schedule override program shown in FIG. 3.

FIG. 4 is a block diagram of the illustrative HVAC controller that is adapted to include the schedule override method shown in FIG. 3. Controller 400 can include a control module 410 that, in some cases, can be a microprocessor or the like. The control module 410 can communicate with a user interface 420, and includes a schedule override menu generator 425, a response acceptor 440, a timer 443, a temporary override schedule 445 and a programmable schedule 450. The control module 410 can generate a control signal 460 to a device (not shown), such as an HVAC system or device.

The schedule override menu generator 425 can provide temporary schedule override choices, as described above, to the user interface 420. The interface 420 can be any form of user interface such as, for example, a physical interface including a LCD with selection buttons, a touchscreen, an aural interface including a speaker and microphone or both or any other suitable user interface. A user can activate the schedule override menu generator 425 by any suitable selection mechanism, such as by pressing a schedule button on a touchscreen of the user interface 420. In response to the schedule override choices, the user can enter a user response into the user interface 420. The response acceptor 440 accepts the user response and provides an indication of the response to the timer 443, which communicates with the temporary override schedule 445 which communicates with the programmable schedule 450. In the illustrative embodiment, the programmable schedule 450 has a number of time and temperature set points previously defined. The temporary override schedule overrides the programmable schedule 450 following a time interval monitored by the timer 443 and for the time period identified by the user response to the schedule override menu generator or until the schedule 450 signals a temperature change based on the normal operating schedule. A control signal 460 is generated by the control module 410 based on the temporary override schedule 445.

Figure 5:
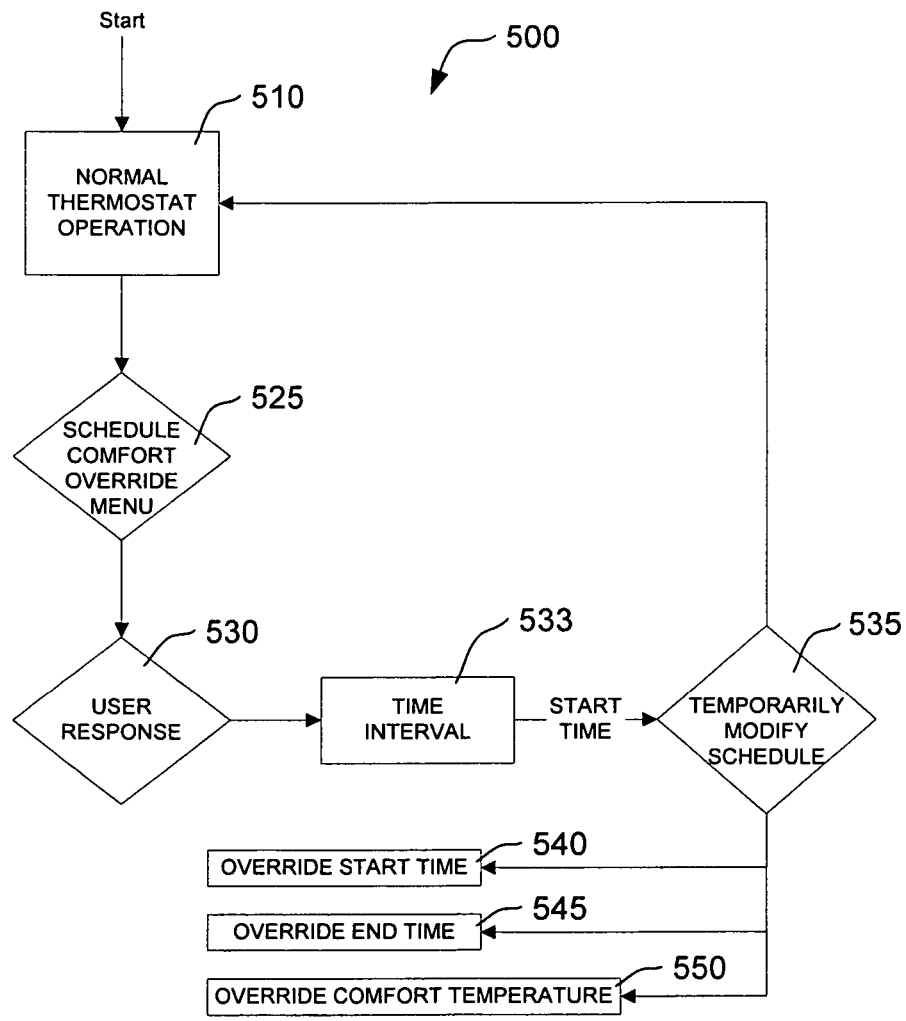
FIG. 5 is a flow diagram of another illustrative HVAC schedule override program.

FIG. 5 is a flow diagram of another illustrative HVAC schedule override program 500. The flow diagram starts at a normal thermostat operation block 510, but this is not required in all embodiments. In the illustrative embodiment, when operated in the normal thermostat operation block 510, a programmed thermostat schedule may be followed to regulate environmental conditions of the area where, for example, a temperature sensor is located. The programmed schedule can activate the controller to send one or more control signals to HVAC equipment on a certain schedule, many times determined by the user. The interface may include a menu routine that permits the user to program the schedule, which may then change the temperature at one or more times during a particular day, such as a temperature setting for a "wake" time interval, a "leave" time interval, a "return" time interval and/or a "sleep" time interval. In the illustrative embodiment, the user can program a start time and a heat and/or cool temperature for each desired time interval.

Schedule comfort override menu block 525 provides one or more schedule comfort override menu choices to a user via the user interface. The user interface can accept one or more responses at block 530 to the one or more schedule comfort override menu choices from the user at a first time via the user interface to temporarily modify a preexisting schedule at block 535 at a second time that is later than the first time as indicated by time interval block 533. At the second later time, and as shown at block 535, one or more schedule parameters 540, 545, 550 are modified or overridden based on the user responses accepted by user response block 530 at the first earlier time. In the illustrative embodiment, once the temporary schedule override time interval expires, the controller returns to the normal operation block 510.

Schedule comfort override menu block 525 can provide one, two, three, four, five, six, seven, eight, nine, or ten or more menu choices from which a user can chose. In some embodiments, these menu choices can also solicit information from the user regarding the parameters of the desired schedule override condition such as, for example, the starting time of the override schedule, the ending time or duration of the override schedule and/or the desired temperature of the override schedule. The schedule comfort override menu choices block 525 can include choices that are natural language questions, some of which may be phrases that can include one, two, three, four, five, six, seven or more words. In some cases, schedule comfort override menu choices block 525 can provide menu choices such as, "Come Home Early," "Get Up Early," "Stay Home," "Stay Up Late," and/or any other menu choices as desired These schedule comfort override choices generally override an energy savings temperature setting in a normal thermostat schedule.

The chosen time interval 533 can be, for example, at least 10 minutes, at least 30 minutes, at least 1 hour, at least 4 hours, at least 24 hours, or any other time interval as desired.

The time interval can be determined by the schedule override program based on the schedule override menu choice selected by the user. For instance, using the predefined schedule structure described above (wake, leave, return, sleep) the user may choose and the controller may accept a schedule override menu choice of "Stay Home" at 7:00 p.m., the night before the user plans on staying home for the following day. The program can override the normal operating "leave" energy savings thermostat temperature of the following day, and apply the normal operating schedule "wake" temperature setting, or request a temperature setting from the user to be applied until the next normal operating temperature change occurs following the normal "leave" energy savings thermostat temperature such as a "return" temperature at a normal operating time of, for example, 5:00 p.m., If the normal operating "leave" start time is, for example, 7:00 a.m., then at 7:00 a.m., the controller may apply the entered override temperature or the normal operating "wake" temperature and resume normal thermostat operation following the expiration of the normal operating "leave" time. In this example, the interface accept the user override response at 7:00 p.m., the previous night, and modifies the normal operating schedule a time interval of 12 hours later overriding the normal operating schedule from sending a "leave" temperature control signal at 7:00 a.m. Instead, the controller continues to send a "wake" temperature (or other entered temperature) signal until the 5:00 p.m., "return" normal thermostat operation. The controller may then return to the normal thermostat operation in accordance to the normal operating schedule.

Thus, a user can quickly and easily modify the normal thermostat operating schedule to accommodate an interruption in the normal thermostat operating schedule without disabling the normal thermostat schedule or completely reprogramming the controller before the thermostat interruption and again reprogramming the controller after the interruption. Thus, the user can schedule one or more interruptions in the normal thermostat operating schedule that will modify the normal thermostat operating schedule at a future time and then return the operating schedule to its normal operating schedule.

Figure 6:
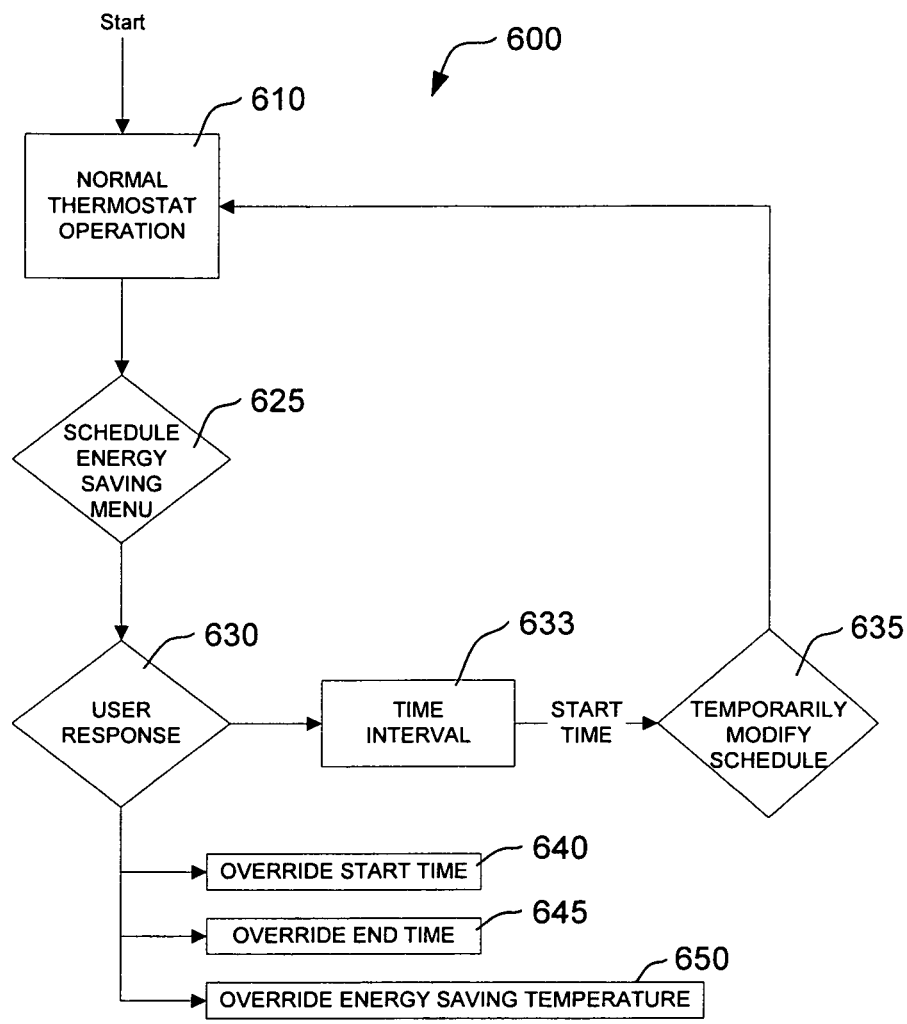
FIG. 6 is a flow diagram of another illustrative HVAC schedule override program.

FIG. 6 is a flow diagram of an illustrative HVAC schedule override program 600. The flow diagram starts at a normal thermostat operation block 610, but this is not required in all embodiments. In the illustrative embodiment, when operated in the normal thermostat operation block 610, a programmed thermostat schedule may be followed to regulate environmental conditions of the area where, for example, a temperature sensor is located. The programmed schedule can activate the controller to send one or more control signals to HVAC equipment on a certain schedule, many times determined by the user. The interface may include a menu routine that permits the user to program the schedule, which may then change the temperature at one or more times during a particular day, such as a temperature setting for a "wake" time interval, a "leave" time interval, a "return" time interval and/or a "sleep" time interval. In the illustrative embodiment, the user can program a start time and a heat and/or cool temperature for each desired time interval.

Schedule energy savings override menu block 625 provides one or more schedule energy savings override menu choices to a user via the user interface. The user interface can accept one or more responses at block 630 to the one or more schedule energy savings override menu choices from the user at a first time via the user interface to temporarily modify a preexisting schedule at block 635 at a second time that is later than the first time as indicated by time interval block 633. At the second later time, and as shown at block 635, one or more schedule parameters 640, 645, 650 are modified or overridden based on the user responses accepted by user response block 630 at the first earlier time. In the illustrative embodiment, once the temporary schedule override time interval expires, the controller returns to the normal operation block 610.

Schedule energy savings override menu block 625 can provide one, two, three, four, five, six, seven, eight, nine, or ten or more menu choices from which a user can chose. In some embodiments, these menu choices can also solicit information from the user regarding the parameters of the desired schedule override condition such as, for example, the starting time of the override schedule, the ending time or duration of the override schedule and/or the desired temperature of the override schedule. The schedule energy savings override menu choices block 625 can include choices that are natural language questions, some of which are phrases that can include one, two, three, four, five, six, seven or more words. In some cases, schedule energy savings override menu choices block 625 can provide menu choices such as, "On Vacation," "Come Home Late," or any other suitable menu choice, as desired. These schedule energy savings override choices generally override an energy saving temperature setting in a normal thermostat schedule.

The chosen time interval 633 can be for example, at least 10 minutes, at least 30 minutes, at least 1 hour, at least 4 hours, at least 24 hours, or any other time interval, as desired.

The time interval can be determined by the schedule override program based on the schedule override menu choice selected by the user. For instance, using the predefined schedule structure described above (wake, leave, return, sleep) the user may choose and the controller may accept a schedule override menu choice of "On Vacation" at 7:00 p.m., the night before the user plans on leaving home for example, on a two day vacation starting at 6:00 a.m., the following morning. The program can override the normal operating thermostat temperature of the following day, and apply the normal operating schedule "leave" temperature setting, or request an energy savings temperature setting from the user to be applied from the vacation start time until the expiration of the end time provided by the user. At the expiration of the end time, the thermostat controller returns to the normal operating schedule.

If the entered vacation start time is, for example, 6:00 a.m., then at 6:00 a.m., the controller applies the entered override energy savings temperature or the normal operating "leave" temperature until the expiation of the end time provided by the user. In this example, the interface accepts the user override response at 7:00 p.m. the previous night, and modifies the normal operating schedule 11 hours later, overriding the normal operating schedule from sending a "leave" temperature control signal at 6:00 a.m. Instead, the controller continues to send a "leave" temperature or other entered temperature signal until the end time, two days later. The controller may then return to the normal thermostat operation in accordance to the normal operating schedule.

Thus, a user can quickly and easily modify the normal thermostat operating schedule to accommodate one or more interruptions in the normal thermostat operating schedule without disabling the normal thermostat schedule or completely reprogramming the controller before the thermostat interruption and again reprogramming the controller after the interruption. Thus, the user can schedule one or more interruptions in the normal thermostat operating schedule that will modify the normal thermostat operating schedule at a future time and then return the operating schedule to its normal operating schedule.

Figure 7:
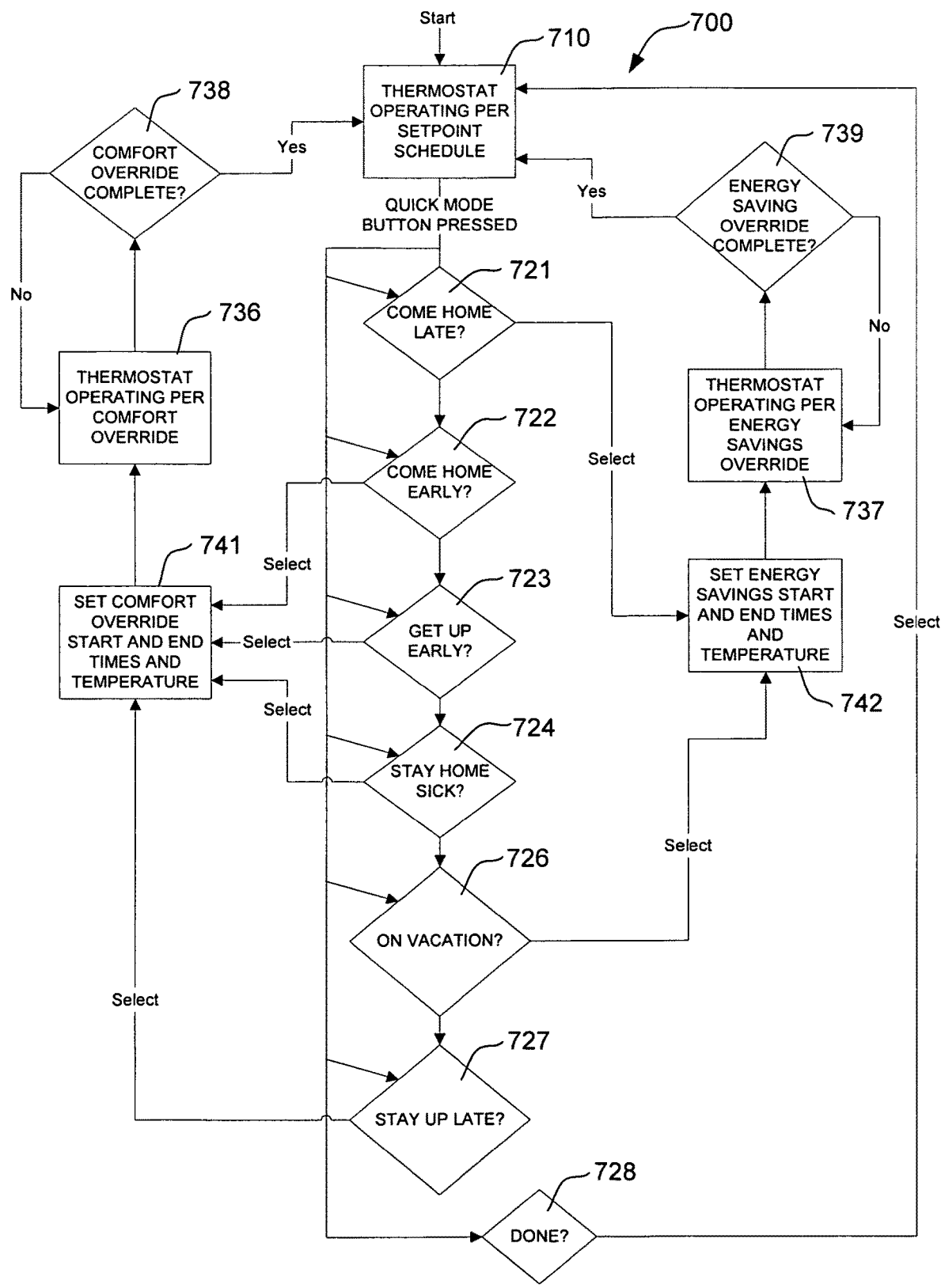
FIG. 7 is a flow diagram of another illustrative HVAC schedule override program.

FIG. 7 is a flow diagram of yet another illustrative HVAC schedule override program 700. The flow diagram starts at a normal thermostat operation block 710, but this is not required in all embodiments. The schedule override program 700 can be initiated by pressing a program initiation button or key such as, for example a "Quick Mod" or "Quick Modification" button on a user interface.

The program can begin by providing a menu listing of schedule override choices such as, "Come Home Late" block 721, "Come Home Early" block 722, "Get Up Early" block 723, "Stay Home" block 724, "On Vacation" block 726, and "Stay Up Late" block 727. If the user chooses one of blocks 722, 723, 724, or 727, then the program can request a comfort override start time, end time or duration, and/or comfort override temperature, as shown at block 741. If the user chooses one of blocks 721 or 726, then the illustrative program can request an energy savings override start time, end time or duration, and/or energy savings override temperature, as shown at block 742. If the user does not choose a menu override choice, the user can select a "Done" button or key at block 728 and return to normal thermostat operation block 710.

Once the user has entered a comfort override start time, end time or duration, and/or comfort override temperature via block 741 or an energy saving override start time, end time, and/or energy saving override temperature via block 742, the thermostat can operate according to the entered comfort override parameters block 736 or the energy savings override parameters block 737. Once either the comfort override is complete at block 738 or the energy savings override is complete at block 739, then the thermostat may return to normal operation at block 710.

FIGS. 8A-D are schematic drawings of an illustrative HVAC controller interface 800 showing an embodiment of the flow diagram of the method shown in FIG. 7. The schematic screen shots are taken in sequential order based on the user selections shown in each screen shot. At FIG. 8A, the interface 800 indicates that the controller is following a "NORMAL SCHEDULE" at 802. A user 810 selects a "Quick Mod" button 810 located on the interface 800 starting the schedule override program.

Figure 8A:
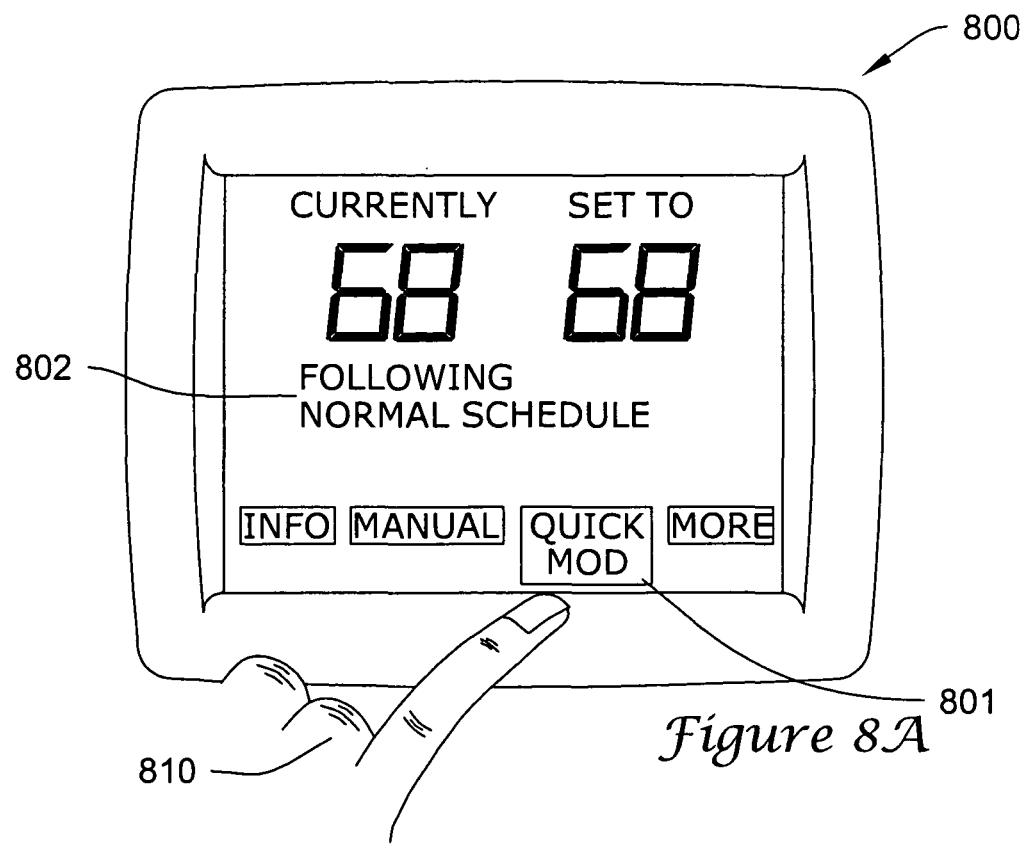
FIGS. 8A-8D are schematic drawings of an illustrative HVAC interface showing an embodiment of the flow diagram of the illustrative HVAC schedule override program shown in FIG. 7.
Figure 8B:
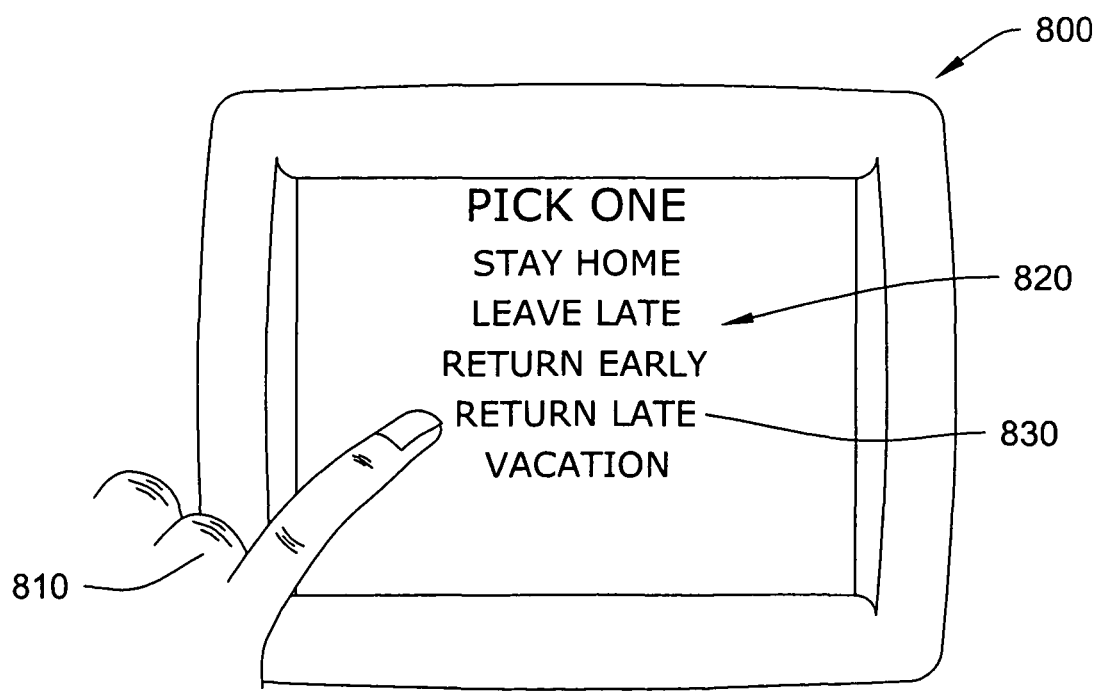

At FIG. 8B and in the illustrative embodiment, the program provides the user 810, via the interface 800, a menu listing of schedule override menu choices 820. The user 810 is shown selecting the "RETURN LATE" response 830.

Figure 8C:
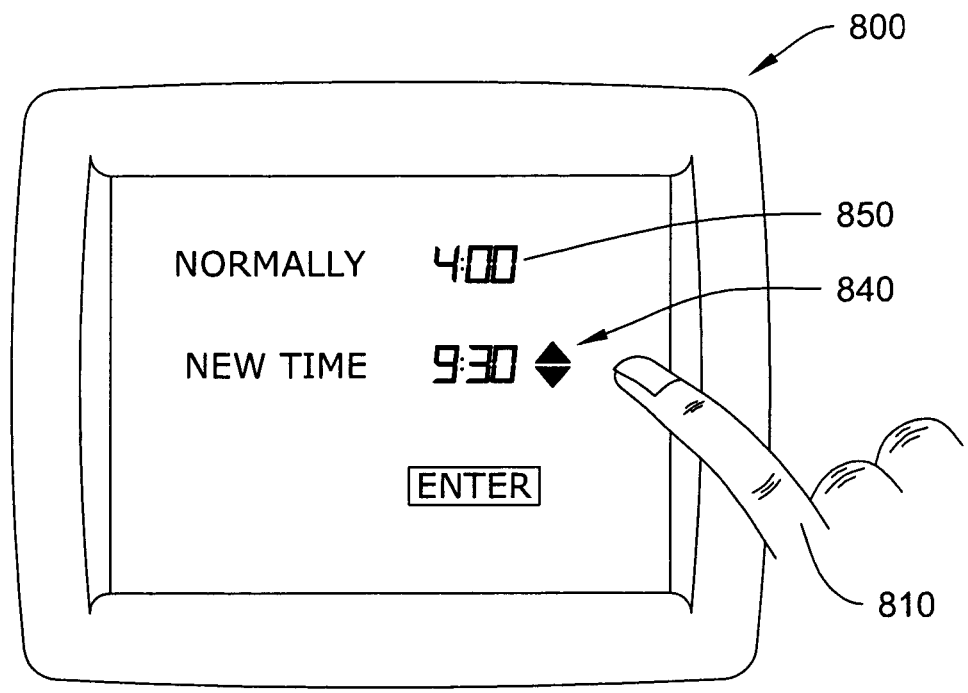

At FIG. 8C, the program asks the user 810, via the interface 800, to enter schedule override return late time

840. The user 810 is shown entering a time of 9:30. In other embodiments, the program can ask for a time duration. This illustrative interface 800 also displays the normal return time 850 of 4:00.

Figure 8D:
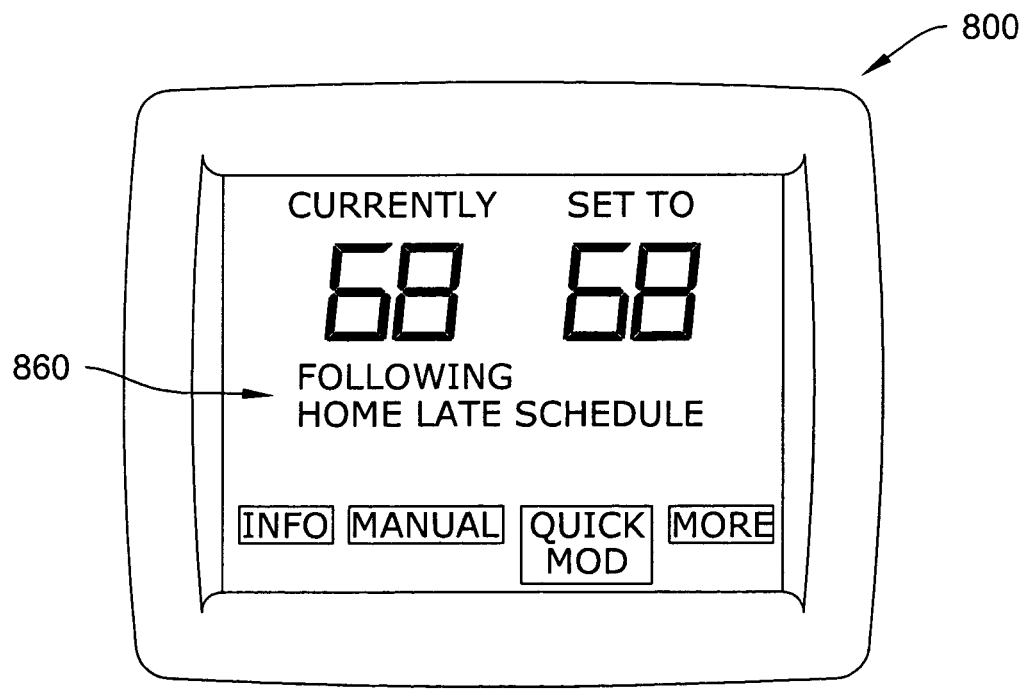

At FIG. 8D, the program displays via the interface 810 that the program is following a "HOME LATE SCHEDULE" 860.

Figure 9A:
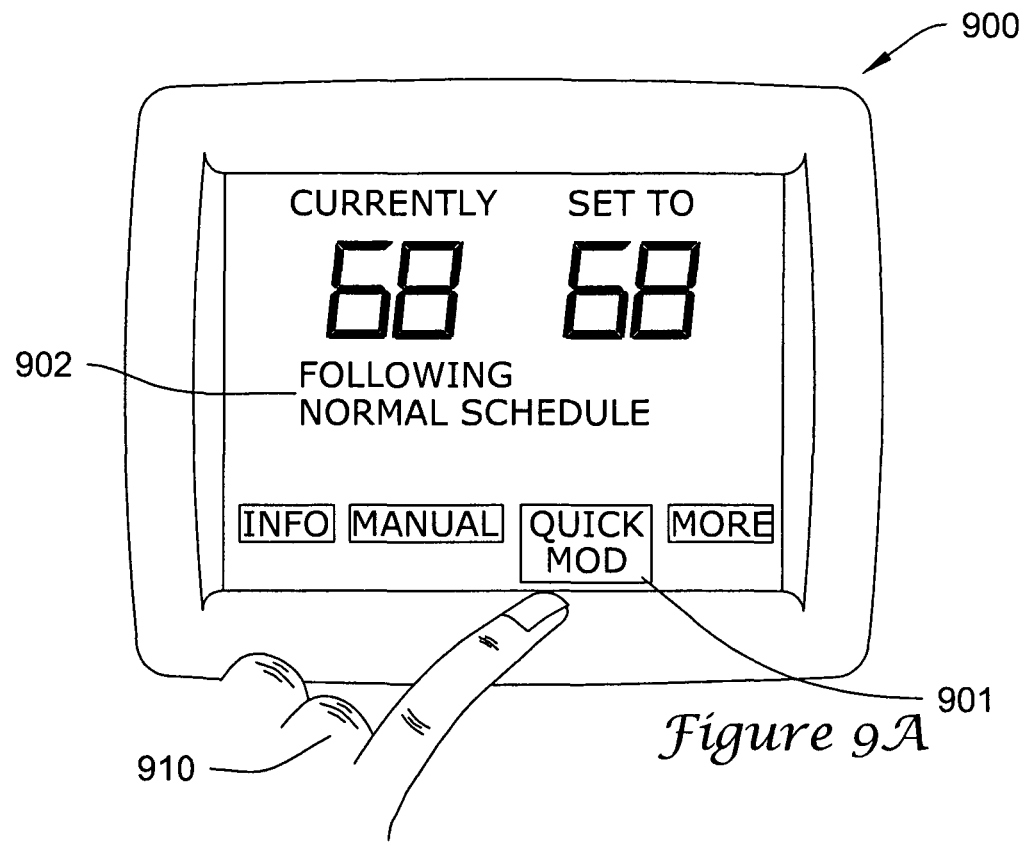
FIGS. 9A-9C are schematic drawings of an illustrative HVAC interface showing an embodiment of the flow diagram of the illustrative HVAC schedule override program shown in FIG. 7.
Figure 9B:
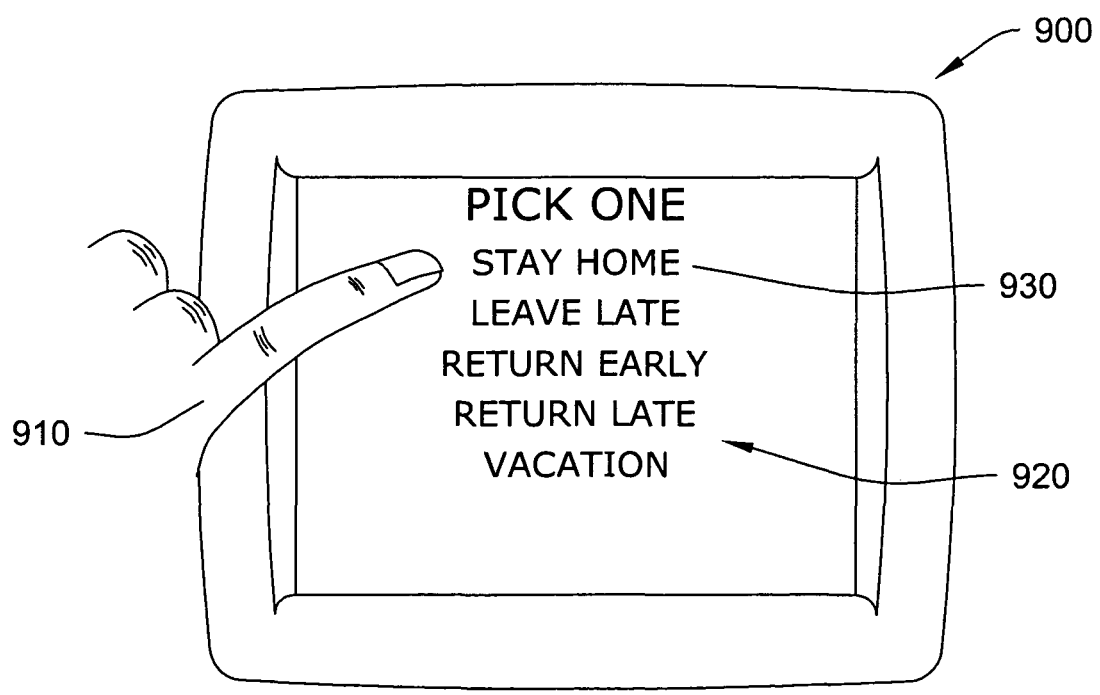
Figure 9C:
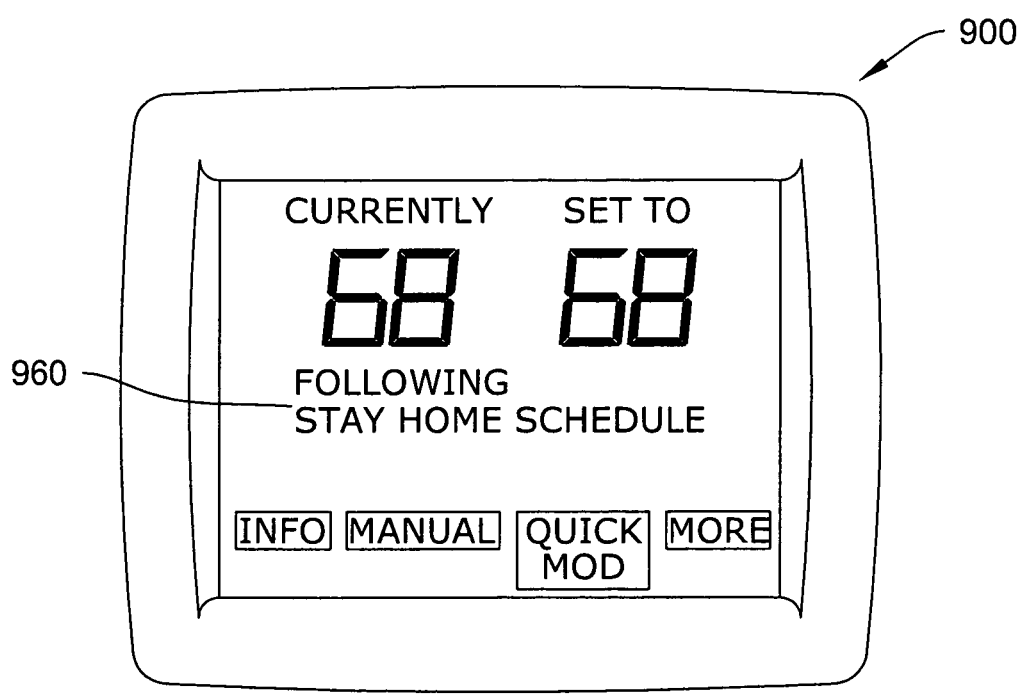

FIGS. 9A-C are schematic drawings of an illustrative HVAC interface 900 showing another illustrative embodiment of the flow diagram of the method shown in FIG. 7. The schematic screen shots are taken in sequential order based on the user selections shown in each screen shot. At FIG. 9A, the interface 900 indicates that the controller is following a "NORMAL SCHEDULE" at 902. A user 910 selects a "Quick Mod" 910 button located on the interface 900 to beginning the schedule override program.

At FIG. 9B, the program provides the user 910, via the interface 900, a menu listing of schedule override menu choices 920. The user 810 is shown selecting the "STAY HOME" response 930. This selection can override an energy savings temperature set point and maintain a comfort temperature set point during a period of time normally dedicated to an energy savings temperature set point. For example, the "leave" set point of the normal schedule can be skipped. After expiration of the "leave" time period of the normal operating schedule, the controller can return the controller back to a normal schedule. At FIG. 9C, the program displays via the interface 910 that the program is following a "STAY HOME SCHEDULE" 960.

Figure 10:
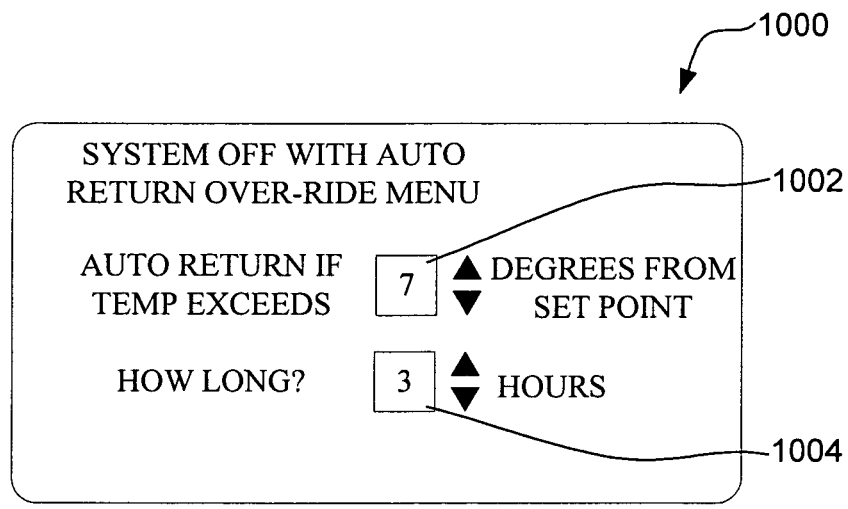
FIG. 10 is a schematic drawing showing an illustrative HVAC interface that includes a system off with auto return function.

FIG. 10 is a schematic drawing showing an illustrative HVAC interface that includes a system off with auto return function. Some days, a user may believe that heat and/or air conditioning may not be required. On such days, the users can simply turn the HVAC system "off". However, it may be desirable to provide an automatic backup, with a wider control dead band, that would automatically return the HVAC system to the programmed schedule, or some other predetermined schedule or set point, in the event the inside temperature of the inside space swings beyond the wider dead band. This may be referred to as a system off with auto return mode. This may help prevent the temperature in the inside space from becoming overly uncomfortable. Also, when enabled, the user may not have to remember to turn the system back "on".

The wider dead band and/or set point(s) may be preset, or user definable. For example, and in the illustrative HVAC interface shown in FIG. 10, the HVAC interface 1000 may request a temperature offset 1002. In the illustrative embodiment, the temperature offset 1002 is expressed as an offset from the set point of the programmed schedule, and may correspond to the wider dead band or set point(s) of the system off with auto return mode. It is recognized that the temperature offset 1002 may be expressed as an offset from any fixed or variable value, as desired. Alternatively, rather than expressing a temperature offset as shown at 1002, and in some cases, the HVAC interface 1000 may request an absolute temperature value or values.

In the illustrative HVAC interface 1000, if the temperature of the inside space exceeds (or falls below) the set point of the programmed schedule by an amount greater than the temperature offset 1002, the HVAC system turns back on. In some cases, the HVAC system may maintains the temperature of the inside space at the offset temperature or some other preset temperature. In other cases, the HVAC system may return to a programmed schedule.

In some embodiments, the HVAC interface may also request how long the system should remain in the system off with auto return mode, as shown at 1004. In FIG. 10, a time period of three hours has been selected. In this example, after three hours, the HVAC system exits the system off with auto return mode and returns to a preset temperature or a programmed schedule, as desired. In some cases, if during the three hour period the temperature of the inside space exceeds (or falls below) the set point of the programmed schedule by an amount greater than the temperature offset 1002, the HVAC system may return to the programmed schedule, as mentioned above.

Figure 11:
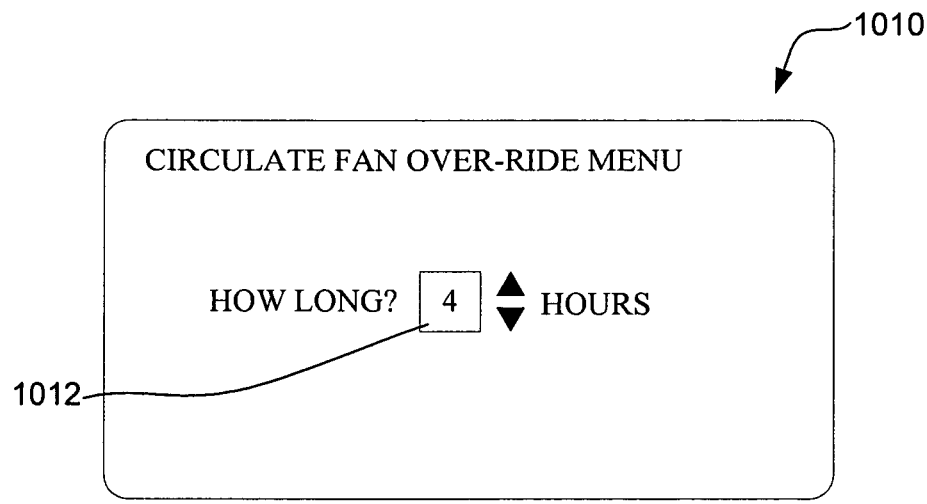
FIG. 11 is a schematic drawing showing an illustrative HVAC interface that includes a circulate fan over-ride function.

FIG. 11 is a schematic drawing showing an illustrative HVAC interface that includes a circulate fan over-ride function. Under some conditions, it may be desirable to over-ride the normal programmed fan control by turning the fan on continuously, artificially increasing the duty cycle of the fan, or otherwise causing increased (or decreased) fan circulation in the inside space. In one illustrative embodiment, and as shown in FIG. 11, the illustrative HVAC interface 1010 may request a time period for how long the fan over-ride function should be maintained. The user may input a time period, such as 4 hours as shown at 1012. After the time period expires, the system may return to the normal programmed schedule, if desired. This may allow a user to increase/decrease fan circulation in an inside space for a period of time. Also, the user may not have to remember to return the fan circulation to the normal programmed schedule later.

Figure 12:
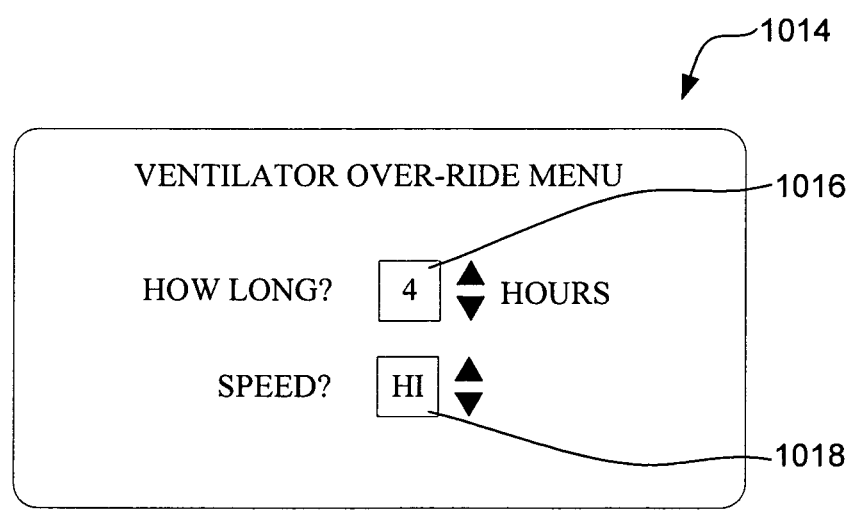
FIG. 12 is a schematic drawing showing an illustrative HVAC interface that includes a ventilator over-ride function.

FIG. 12 is a schematic drawing showing an illustrative HVAC interface that includes a ventilator over-ride function. Under some conditions, it may be desirable to over-ride the normal programmed ventilator operation by, for example, turning on or off a ventilator (or energy recovery ventilator "ERV), change the speed at which the ventilator or ERV operates for a period of time, artificially increasing/decreasing the duty cycle of the ventilator or ERV, or otherwise temporarily changing the ventilation in the inside space. In one illustrative embodiment, and as shown in FIG. 12, the illustrative HVAC interface 1014 may request a time period for how long the ventilator over-ride function should be maintained. The user may input a time period, such as 4 hours as shown at 1016. In the illustrative example, the user may also input a ventilator speed, such as a high speed as shown at 1018. After the time period expires, the system may return to the normal programmed ventilator schedule, if desired. This may allow a user to increase/decrease ventilation in an inside space for a period of time. Also, the user may not have to remember to return the ventilation to the normal programmed schedule later.

Figure 13:
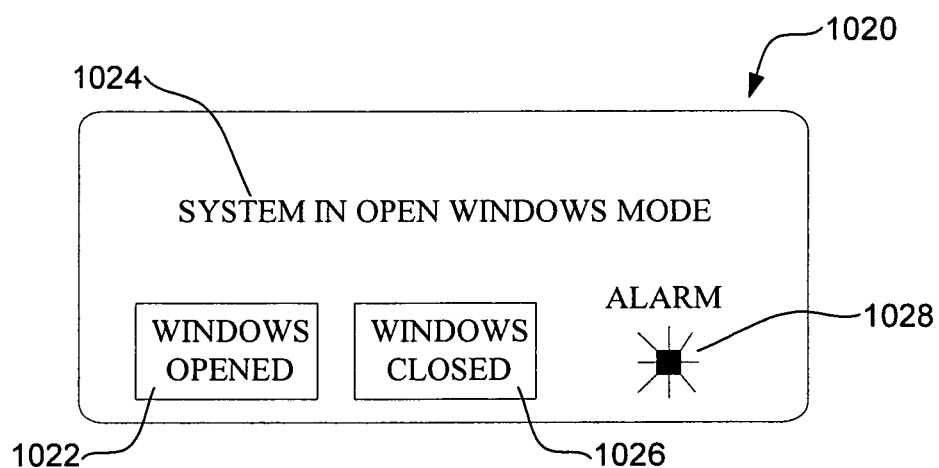
FIG. 13 is a schematic drawing showing an illustrative HVAC interface that includes open windows function.

FIG. 13 is a schematic drawing showing an illustrative HVAC interface 1020 that includes an open windows function. In this illustrative embodiment, the open windows function may allow the user to temporarily suspend some or all of the HVAC system operations when the windows are open. For example, when the windows are open, it may be desirable to turn off the heat, air conditioning, and humidifier functions of the HVAC system. In some cases, it may be desirable to turn on or alter other functions of the HVAC system, such as turning on the fan to help circulate and filter the air.

Referring to FIG. 13, and in the illustrative embodiment, a windows opened button 1022 may be selected by a user when the windows are opened. This may temporarily suspend some or all of the HVAC system operations, and in some cases may activate or alter others (e.g. fan circulate). In the illustrative embodiment, a designation such as "SYSTEM IN WINDOWS OPEN MODE" 1024 may be displayed on the HVAC interface 1020 to notify the user that the HVAC system is in the windows open mode. When the user closes the windows, the user may select the closed window button 1026, which in some embodiments, returns the HVAC system to its normal programmed schedule. In some cases, detectors or the like may be provided to automatically detect when the windows are opened and/or closed. When so provided, the open windows mode may be automatically entered and exited, depending on the current state of the windows.

In some embodiments, a close window alarm 1028 may be provided. The close window alarm may be, for example, an icon displayed on the HVAC interface 1020, an audible alarm (e.g. three beeps at predetermined intervals) and/or any other suitable alarm. The close window alarm 1028 may be activated when, for example: the inside temperature drifts beyond an open window temperature set point—which may be preset or programmed similar to the wider dead band or set point(s) shown in FIG. 10 above—the inside humidity drifts beyond an open window humidity set point (which also may be preset or user definable); the inside air quality (e.g. dust, pollen, gas, etc.) falls outside of an open window air quality range; the barometric pressure drops significantly—which may indicate pending rain; and/or when any other suitable event occurs or is predicted to occur. The alarm may provide an indication to the user that it may be desirable to close the windows. In some cases, the alarm may be disabled and/or enabled, depending on the user's preferences.

Figure 14:
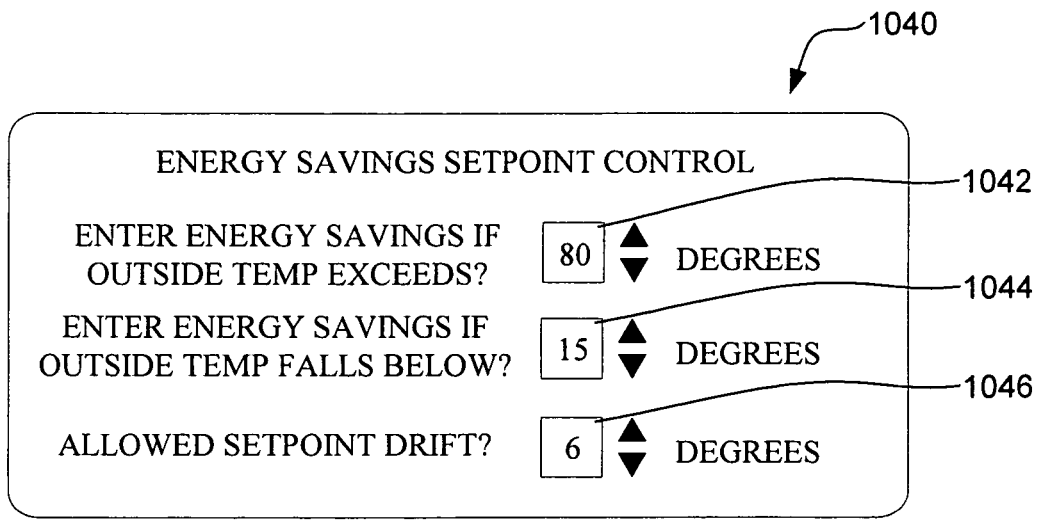
FIG. 14 is a schematic drawing showing an illustrative HVAC interface that includes an energy savings set point control function.

FIG. 14 is a schematic drawing showing an illustrative HVAC interface that includes an energy savings set point control function. On very hot or very cold days, a user may be willing to sacrifice some comfort for increased energy savings. For example, if the outside temp rises above 80 degrees (preset or user definable) or drops below 15 degrees (preset or user definable), an energy saving mode may be entered (automatically or manually) that allows the current temperature set point of the inside space to move by up to 6 degrees (preset or user definable) to provide increased energy savings. In some cases, the amount that the HVAC system control actually allows the set point to move may be dependent on the difference between the outside temperature and the defined energy savings range. For example, and continuing with the above example, if the outside temperature is 82 degrees, the HVAC system control may only allow the set point to move one degree. However, it the outside temperature is 95 degrees, the HVAC system control may allow the set point to move the maximum of 6 degrees.

The illustrative HVAC interface 1040 shown in FIG. 14 allows a user to enter an outside temperature value 1042 that, if exceeded, causes the HVAC system (e.g. controlling the air conditioning system) to enter the energy savings mode described above. The illustrative HVAC interface 1040 also allows a user to enter an outside temperature value 1044 that, if the outside temperature falls below the specified value, causes the HVAC system (e.g. controlling the heating system) to enter the energy savings mode. The illustrative HVAC interface 1040 also allows a user to enter an allowed set point drift 1046, which in this case is set at 6 degrees.

Rather than sensing the outside air temperature, particularly when no outside air temperature sensor is available, it may be desirable to detect when the energy savings mode should be entered by monitoring the HVAC duty cycle. For example, as the temperature of the outside air rises in the summer, the duty cycle of the air conditioner will tend to rise. Likewise, as the temperature of the outside air decreases in the winter, the duty cycle of the heater will tend to increase.

Figure 15:
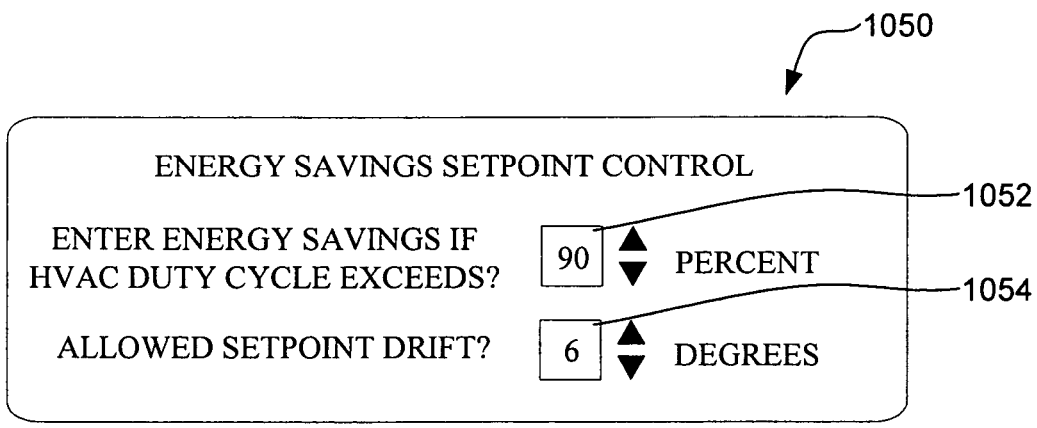
FIG. 15 is a schematic drawing showing another illustrative HVAC interface that includes an energy savings set point control function.

As shown in FIG. 15, an HVAC interface 1050 may be provided to request a duty cycle rate 1052 that, if exceeded, causes the HVAC controller to enter the energy saving mode. For example, if the duty cycle of the HVAC system exceeds 90 percent (preset or user definable) of a maximum (or other defined) duty cycle rate, the energy saving mode can be entered which then allows the current temperature set point for the inside space to move by up a maximum of 6 degrees (preset or user definable) to provide increased energy savings, as described above.

Like above, the amount that the HVAC system control actually allows the set point to move may be dependent on the difference between the sensed duty cycle of the HVAC system and the maximum (or other defined) duty cycle rate. For example, and continuing with the above example, if the sensed duty cycle rate is 92 percent of the maximum (or other defined) duty cycle rate, the HVAC system control may only allow the set point of the inside space to move one degree. However, if the sensed duty cycle rate is 98 percent of the maximum (or other defined) duty cycle rate, the HVAC system control may allow the set point of the inside space to move the maximum 6 degrees.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A method of temporarily interrupting a regular programmable HVAC schedule in a controller having a user interface wherein the user interface comprises a touchscreen, the method comprising the steps of:

accepting a regular programmable operating schedule for the controller from a user via the user interface, wherein the regular programmable operating schedule comprises at least one predetermined operating parameter change scheduled to occur at a programmed time in the future, and wherein, in a normal mode of operation, the controller provides control signals to an HVAC system according to the regular programmable operating schedule;

providing a menu option that presents two or more natural language schedule override choices to a user via the user interface, wherein each of the two or more natural language schedule override menu choices, when selected, results in the controller providing control signals in accordance with a corresponding pre-programmed operating parameter value, that is associated with the selected schedule override menu choice;

accepting a user selection of one of the two or more natural language schedule override choices from the user via the user interface at a first time;

in response to accepting the user selection of the one of the two or more natural language schedule override choices, providing a menu option via the user interface that requests from the user a second time, wherein the second time is in the future;

accepting the second time from the user via the user interface; accepting a third time from the user via the user interface;

automatically temporarily interrupting the regular programmable operating schedule in an override mode according to the selected one of the two or more natural language schedule override choices, the temporarily interrupting step automatically beginning at the second time; and automatically returning to the regular programmable operating schedule at the third time.

2. The method according to claim 1, wherein the second time is later than the first time by a user selected time interval.

3. The method according to claim 2, wherein the user selected time interval is at least 10 minutes.

4. The method according to claim 2, wherein the user selected time interval is at least 30 minutes.

5. The method according to claim 2, wherein the user selected time interval is at least 1 hour.

6. The method according to claim 2, wherein the user selected time interval is at least 24 hours.

7. The method according to claim 1, wherein the second time is accepted as a specific time of day, or is accepted as corresponding to when a predetermined operating parameter change is scheduled to occur in the future in accordance with the regular programmable operating schedule.

8. The method according to claim 1, wherein the providing step comprises providing a schedule override choice of "Come Home Early".

9. The method according to claim 1, wherein the providing step comprises providing a schedule override choice of "Come Home Late".

10. The method according to claim 1, wherein the providing step comprises providing a schedule override choice of "Get Up Early".

11. The method according to claim 1, wherein the providing step comprises providing a schedule override choice of "Stay Up Late".

12. The method according to claim 1, wherein the providing step comprises providing a schedule override choice of "Stay Home".

13. The method according to claim 1, wherein the providing step comprises providing a schedule override choice of "On Vacation".

14. The method of claim 1, wherein the third time comprise a duration, and wherein automatically returning to the regular programmable operating schedule at the third time comprises automatically returning to the regular programmable operating schedule after the duration.

15. The method of claim 1, wherein the third time comprises an end time.

16. A controller comprising:
a controller for accepting a regular programmable operating schedule for the controller from a user via a user interface, wherein the user interface comprises a touchscreen and wherein the regular programmable operating schedule comprises at least one predetermined operating parameter change scheduled to occur at a programmed time in the future, and wherein, in a normal mode of operation, the controller provides control signals to an HVAC system according to the regular programmable operating schedule;
a menu option that presents two or more natural language schedule override choices to a user via the user interface, wherein each of the two or more natural language schedule override menu choices, when selected, results in the controller providing control signals in accordance with a corresponding pre-programmed operating parameter value, that is associated with the selected schedule override menu choice;
the user interface configured to accept a user selection of one of the two or more natural language schedule override choices from the user via the user interface at a first time;
in response to accepting the user selection of the one of the two or more natural language schedule override choices, providing a menu option via the user interface that requests from the user a second time, wherein the second time is in the future;
the user interface configured to accept the second time from the user via the user interface;
the user interface configured to accept a third time from the user via the user interface;
wherein the regular programming operating schedule is automatically temporarily interrupted in an override mode according to the selected one of the two or more natural language schedule override choices, the temporarily interrupting step automatically beginning at the second time; and
wherein the controller is configured to automatically return to the regular programmable operating schedule at the third time.

17. The controller according to claim 16, wherein the second time is accepted as a specific time of day, or is accepted as corresponding to when a predetermined operating parameter change is scheduled to occur in the future in accordance with the regular programmable operating schedule.

18. The controller according to claim 16, wherein the user interface provides a schedule override menu choice of "Come Home Early".

19. The controller according to claim 16, wherein the user interface provides a schedule override menu choice of "Come Home Late".

20. The controller according to claim 16, wherein the user interface provides a schedule override menu choice of "Get Up Early".

21. The controller according to claim 16, wherein the user interface provides a schedule override menu choice of "Stay Up Late".

22. The controller according to claim 16, wherein the user interface provides a schedule override menu choice of "Stay Home".

23. The controller according to claim 16, wherein the user interface provides a schedule override menu choice of "On Vacation".

24. The controller according to claim 16, wherein the second time is later than the first time by a user selected time.

25. The controller according to claim 24, wherein the user selected time is at least 10 minutes.

26. The controller according to claim 24, wherein the user selected time is at least 30 minutes.

27. The controller according to claim 24 wherein the user selected time is at least 1 hour.

28. The controller according to claim 24, wherein the user selected time is at least 24 hours.

29. The controller according to claim 16, wherein the second time is accepted as a specific time of day, or is accepted as corresponding to when a predetermined operating parameter change is scheduled to occur in the future in accordance with the regular programmable operating schedule.

30. The controller according to claim 16, wherein the third time comprise a duration, and wherein to automatically return to the regular programmable operating schedule at the third time, the controller is configured to return to the regular programmable operating schedule after the duration.

31. The controller according to claim 16, wherein the third time comprises an end time.

* * * * *